(12) United States Patent
Komaba et al.

(10) Patent No.: US 8,514,439 B2
(45) Date of Patent: Aug. 20, 2013

(54) IMAGE PROCESSING SYSTEM AND IMAGE PROCESSING METHOD FOR ESTIMATING IMAGE FORMING OPERATION CHARGES

(75) Inventors: Kenichi Komaba, Toyokawa (JP); Eiichi Yoshida, Toyokawa (JP); Takuya Okada, Toyokawa (JP); Toshimi Shinchi, Toyokawa (JP); Masao Hosono, Toyokawa (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 105 days.

(21) Appl. No.: 13/295,576

(22) Filed: Nov. 14, 2011

(65) Prior Publication Data
US 2012/0120448 A1    May 17, 2012

(30) Foreign Application Priority Data
Nov. 16, 2010   (JP) .................................. 2010-256361

(51) Int. Cl.
*G06F 3/12*   (2006.01)

(52) U.S. Cl.
USPC ......... 358/1.15; 358/1.9; 358/1.13; 358/1.14; 358/1.16; 358/1.18; 705/34; 705/42; 705/400; 705/408; 709/220; 709/223; 709/226; 709/230; 709/234; 399/8; 399/79; 399/80

(58) Field of Classification Search
None
See application file for complete search history.

(56) References Cited

U.S. PATENT DOCUMENTS

| | | | | |
|---|---|---|---|---|
| 4,827,423 A | * | 5/1989 | Beasley et al. | 700/96 |
| 2005/0080750 A1 | * | 4/2005 | Carling et al. | 705/400 |
| 2007/0273915 A1 | * | 11/2007 | Nakagawa | 358/1.14 |
| 2009/0204694 A1 | * | 8/2009 | Kaneko | 709/223 |
| 2012/0120447 A1 | * | 5/2012 | Yoshida et al. | 358/1.15 |
| 2012/0140276 A1 | * | 6/2012 | Haba et al. | 358/1.15 |
| 2012/0162682 A1 | * | 6/2012 | Tomiyasu et al. | 358/1.13 |
| 2012/0287469 A1 | * | 11/2012 | Tomiyasu et al. | 358/1.15 |

FOREIGN PATENT DOCUMENTS

| | | |
|---|---|---|
| JP | 2002-330253 A | 11/2002 |
| JP | 2003-067832 A | 3/2003 |
| JP | 2004-289500 A | 10/2004 |
| JP | 2005-267553 | 9/2005 |
| JP | 2007-058462 A | 3/2007 |
| JP | 2009-129340 A | 6/2009 |

* cited by examiner

*Primary Examiner* — Marivelisse Santiago Cordero
*Assistant Examiner* — Miya J Cato
(74) *Attorney, Agent, or Firm* — Buchanan Ingersoll & Rooney PC

(57) ABSTRACT

An image processing server in charge of a first image processing operation determines a reference value for a reference item; generates first reference information; calculates its charge; generates first charge information indicating its calculated amount of charge; and transmits the first reference information and the first charge information to the next location, separately from image data obtained by the first image processing operation. An image processing server in charge of a second image processing operation calculates its charge based on the reference value determined by the image processing server in charge of the first image processing operation; generates second charge information indicating its calculated charge; and transmits this second charge information, the first reference information and first charge information generated by the image processing server in charge of the first image processing operation, to the next location, separately from image data obtained by the second image processing operation.

22 Claims, 21 Drawing Sheets

FIG. 7

Service Information

| Order of Service | Document Image Transfer Port | Information Communication Port | Name of Service | Reference Item | Amount of Charge |
|---|---|---|---|---|---|
| 1 | http://www.service1.or.jp/image/ | http://www.service1.or.jp/com/ | Blank Page Removal | Number of Pages | — |
| 2 | http://www.service2.or.jp/image/ | http://www.service2.or.jp/com/ | OCR | Number of Pages | — |
| 3 | http://www.service3.or.jp/image/ | http://www.service3.or.jp/com/ | Ground Pattern Merging | Number of Pages | — |
| 4 | http://www.service4.or.jp/image/ | http://www.service4.or.jp/com/ | Translation | Number of Characters | — |
| 5 | http://www.service5.or.jp/image/ | http://www.service5.or.jp/com/ | File Format Conversion | Size of Document Space (X times as large as A5) | — |

Estimation Reference Information

| Reference Item | Determined Value |
|---|---|
| Number of Pages | 10 |
| Number of Characters | 200 |
| Size of Document Space (X times as large as A5) | 40 |

Before the start of a job

| Reference Item | Determined Value |
|---|---|
| Number of Pages | TBD |
| Number of Characters | TBD |
| Size of Document Space (X times as large as A5) | TBD |

FIG.10

When a document is set

| Reference Item | Determined Value |
|---|---|
| Number of Pages | 12 |
| Number of Characters | TBD |
| Size of Document Space (X times as large as A5) | 24 |

FIG.11

Estimation Reference Information

| Reference Item | Determined Value |
|---|---|
| Number of Pages | 10 |
| Number of Characters | TBD |
| Size of Document Space (X times as large as A5) | 20 |

Service Information

| Order of Service | Document Image Transfer Port | Information Communication Port | Name of Service | Reference Item | Amount of Charge |
|---|---|---|---|---|---|
| 1 | http://www.service1.or.jp/image/ | http://www.service1.or.jp/com/ | Blank Page Removal | Number of Pages | ¥50 |
| 2 | http://www.service2.or.jp/image/ | http://www.service2.or.jp/com/ | OCR | Number of Pages | — |
| 3 | http://www.service3.or.jp/image/ | http://www.service3.or.jp/com/ | Ground Pattern Merging | Number of Pages | — |
| 4 | http://www.service4.or.jp/image/ | http://www.service4.or.jp/com/ | Translation | Number of Characters | — |
| 5 | http://www.service5.or.jp/image/ | http://www.service5.or.jp/com/ | File Format Conversion | Size of Document Space (X times as large as A5) | — |

FIG.14

Estimation Reference Information

| Reference Item | Determined Value |
|---|---|
| Number of Pages | 10 |
| Number of Characters | 300 |
| Size of Document Space (X times as large as A5) | 20 |

FIG.15

| Order of Service | Document Image Transfer Port | Information Communication Port | Name of Service | Reference Item | Amount of Charge |
|---|---|---|---|---|---|
| 1 | http://www.service1.or.jp/image/ | http://www.service1.or.jp/com/ | Blank Page Removal | Number of Pages | ¥50 |
| 2 | http://www.service2.or.jp/image/ | http://www.service2.or.jp/com/ | OCR | Number of Pages | ¥100 |
| 3 | http://www.service3.or.jp/image/ | http://www.service3.or.jp/com/ | Ground Pattern Merging | Number of Pages | — |
| 4 | http://www.service4.or.jp/image/ | http://www.service4.or.jp/com/ | Translation | Number of Characters | — |
| 5 | http://www.service5.or.jp/image/ | http://www.service5.or.jp/com/ | File Format Conversion | Size of Document Space (X times as large as A5) | — |

FIG.16

| Order of Service | Document Image Transfer Port | Information Communication Port | Name of Service | Reference Item | Amount of Charge |
|---|---|---|---|---|---|
| 1 | http://www.service1.or.jp/image/ | http://www.service1.or.jp/com/ | Blank Page Removal | Number of Pages | ¥50 |
| 2 | http://www.service2.or.jp/image/ | http://www.service2.or.jp/com/ | OCR | Number of Pages | ¥100 |
| 3 | http://www.service3.or.jp/image/ | http://www.service3.or.jp/com/ | Ground Pattern Merging | Number of Pages | ¥10 |
| 4 | http://www.service4.or.jp/image/ | http://www.service4.or.jp/com/ | Translation | Number of Characters | — |
| 5 | http://www.service5.or.jp/image/ | http://www.service5.or.jp/com/ | File Format Conversion | Size of Document Space (X times as large as A5) | — |

FIG.17

IMAGE PROCESSING SYSTEM AND IMAGE PROCESSING METHOD FOR ESTIMATING IMAGE FORMING OPERATION CHARGES

This application claims priority under 35 U.S.C. §119 to Japanese Patent Application No. 2010-256361 filed on Nov. 16, 2010, the entire disclosure of which is incorporated herein by reference in its entirety.

BACKGROUND OF THE INVENTION

1. Field of the Invention

The present invention relates to an image processing system including one or more than one image processing server and an image forming apparatus such as a multifunctional digital machine also referred to as MFP (Multi Function Peripheral) which are connected to each other via a network; and an image processing method implemented by the image processing system.

2. Description of the Related Art

The following description sets forth the inventor's knowledge of related art and problems therein and should not be construed as an admission of knowledge in the prior art.

As well as such an image processing system mentioned above which is configured to make an image forming apparatus perform all image processing operations on image data inputted to the image forming apparatus, there has been a suggested image processing system which is configured to make multiple external image processing servers cooperatively perform their own and different image processing operations on image data inputted to an image forming apparatus (for example, Japanese Unexamined Patent Publications No. 2004-289500 and No. 2009-129340).

In such an image processing system which makes multiple image processing servers with specific functions cooperatively perform their specific operations individually, an image forming apparatus, whose resources are too limited to perform all image processing operations, does not have to employ a complex structure with the capability to perform all these functions, which is very advantageous.

And recently, there has been another suggested image processing system which provides image processing services of various service suppliers via the Web so that users can select their preferred ones among them and obtain their target image via the Web, just like SaaS (Software as a Service).

Also, there has been yet another suggested system which makes a MFP for example, at a convenience store or a print shop, to execute jobs like making a hard copy of a document, transmitting scanned data, and the like, and process cash or prepaid card transactions for the jobs.

For example, Japanese Unexamined Patent Publication No. 2002-330253 discloses a system for processing transactions for multiple processing services collectively. And Japanese Unexamined Patent Publication No. 2003-067832 discloses a system for estimating an amount of charge before performing an image forming service, when a mode is selected for the image forming operation. And also, Japanese Unexamined Patent Publication No. 2007-058462 discloses a system allowing: an estimation server to estimate an amount of charge based on the mode or the like set on a MFP; and a MFP to download a right estimation program from the estimation server.

Generally, a system for charging for a finished image processing service as disclosed in Japanese Unexamined Patent Publications No. 2003-067832 and No. 2007-058462 mentioned above is supposed to estimate an amount of charge to confirm with the user before performing the image processing service. However, it is not desirable to allow a difference between the estimated amount and the actual amount. Actually, it is hardly possible to estimate an amount of charge accurately before performing a particular image processing service such as Optical Character Recognition (OCR) or translation, only based on the mode set for the image processing service, just like Japanese Unexamined Patent Publications No. 2003-067832 and No. 2007-058462. Therefore, in terms of accuracy, it is desirable to estimate an amount of charge before performing such a particular image processing service, based on the actual number of the target sides of sheets, the actual number of characters, the actual size of document spaces, and the like. In other words, such a system as disclosed in the prior art documents above is required to estimate an amount of charge before performing such a particular image processing service, not based on the mode set for the image processing service, but based on the actual number of the target sides of sheets, the actual number of characters, the actual size of document spaces, and the like.

With a system for making multiple image processing servers cooperatively perform their own image processing services as disclosed in Japanese Unexamined Patent Publications No. 2004-289500 and No. 2009-129340 mentioned above, it takes too long to search for all information of a document image such as number of the target sides of sheets, number of characters, size of document spaces, and the like to estimate an amount of charge, which is a problem.

FIG. 27 illustrates a conventional image processing system in which: an image forming apparatus 300 reads out target image data from a document by its own scanner function; while the image data is transferred to an image processing server A, an image processing server B, and then an image processing server C, in this order, the image processing servers A, B, and C perform different image processing services on the image data subsequently; after all the image processing services, the image forming apparatus 300 receives the image data from the image processing server C and transmit the image data which is converted into a predetermined image file format.

Receiving the image data, the image processing servers A, B, and C estimate an amount of charge for their own image processing services and transfer the image data along with their estimated amounts to the image processing servers B and C, and the image forming apparatus 300, respectively. Receiving the estimated amounts of all the image processing servers from the image processing server C which is in charge of the last image processing service, the image forming apparatus 300 calculates the sum of the estimated amounts of charge, displays the total amount of charge to confirm with the user, and performs transaction processing when the user inserts as much money as the total amount of charge shown on the display, into the transaction processing apparatus.

In such a conventional system, users generally would like to know an amount to be paid as soon as possible, while may suffer from stress if being made waiting too long until the amount appear on the display. Therefore, it is desirable to display an amount of charge for users as soon as possible.

FIG. 28 illustrates another conventional image processing system in which: the image forming apparatus 300 transmits image data to all the image processing servers A, B, and C in a direct manner, and the image processing servers A, B, and C transmit in return their estimated amounts of their own image processing services to the image forming apparatus 300 also in a direct manner. In such a conventional system, the image processing servers sometimes do not perform their own image processing services because image data obtained by an image processing service may be unfavorably converted by the next image processing service, which leads to charging too much or too little because of a difference between the estimated amount and the actual amount.

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

SUMMARY OF THE INVENTION

In a first aspect, the present invention relates to an image processing system comprising: an image forming apparatus; first and second image processing servers being connected to the image forming apparatus via a network; and a transaction processing apparatus, and allowing: the first and second image processing servers to sequentially perform their own and different image processing operations on target image data originated from the image forming apparatus; and the transaction processing apparatus to process a transaction for all finished image processing operations, the first image processing server comprising:
a first image processor which performs a first image processing operation on the target image data received from the image forming apparatus;
a first reference information generator which determines a reference value for a reference item based on which to calculate an amount of charge for the first image processing operation of the first image processor, based on the target data, and generates first reference information indicating the determined reference value;
a first calculator which calculates an amount of charge for the first image processing operation of the first image processor based on the reference value determined by the first reference information generator and an amount of charge per unit set on the first image processing server, and generates first charge information indicating the calculated amount of charge; and
a transmitter which transmits to the next location, the first reference information generated by the first reference information generator and the first charge information generated by the first calculator, separately from the image data to be obtained by the first image processing operation, and the second image processing server comprising:
a second image processor which performs a second image processing operation on the target image data after the first image processing server finished the first image processing operation;
a second calculator which calculates an amount of charge for the second image processing operation of the second image processor based on the reference value determined by the first image processing server and an amount of charge per unit set on the second image processing server, and generates second charge information indicating the calculated amount of charge; and
a transmitter which transmits to another next location, the first reference information and the first charge information both generated by the first image processing server and the second charge information generated by the second calculator,
wherein the transaction processing apparatus processes a transaction for the first and second image processing operations of the first and second image processing servers, based on the first and second charge information.

In a second aspect, the present invention relates to a method for an image processing system comprising: an image forming apparatus; first and second image processing servers being connected to the image forming apparatus via a network; and a transaction processing apparatus, and allowing: the first and second image processing servers to sequentially perform their own and different image processing operations on target image data originated from the image forming apparatus; and the transaction processing apparatus to process a transaction for all finished image processing operations, the method comprising:

the first image processing server's:
performing a first image processing operation on the target image data received from the image forming apparatus;
determining a reference value for a reference item based on which to calculate an amount of charge for the first image processing operation, based on the target data, and generating reference information indicating the determined reference value;
calculating an amount of charge for the first image processing operation based on the determined reference value and an amount of charge per unit set on the first image processing server, and generates first charge information indicating the calculated amount of charge; and
transmitting to the next location, the generated first reference information and first charge information, separately from the image data to be obtained by the first image processing operation, and
the second image processing server's:
performing a second image processing operation on the target image data after the first image processing server finished the first image processing operation;
calculating an amount of charge for the second image processing operation based on the reference value determined by the first image processing server and an amount of charge per unit set on the second image processing server, and generates second charge information indicating the calculated amount of charge; and
transmitting to another next location, the first reference information and the first charge information both generated by the first image processing server and the generated second charge information,
wherein the transaction processing apparatus processes a transaction for the first and second image processing operations of the first and second image processing servers, based on the first and second charge information.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which:

FIG. 7 is a view illustrating one example of service information;

FIG. 10 is a view illustrating estimation reference information to appear when job execution is started;

FIG. 11 is a view illustrating estimation reference information to appear when a document image is specified;

FIG. 14 is a view illustrating service information including an amount of charge estimated and overwritten by the image processing server in charge of the first image processing service;

FIG. 15 is a view illustrating estimation reference information including the number of characters to be used for estimating an amount of charge, which are overwritten by the image processing server in charge of the second image processing service;

FIG. 16 is a view illustrating service information including an amount of charge estimated and overwritten by the image processing server in charge of the second image processing service;

FIG. 17 is a view illustrating service information including an amount of charge estimated and overwritten by the image processing server in charge of the third image processing service;

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

Hereinafter, one embodiment will be described with reference to the accompanying drawings.

Figure 1:
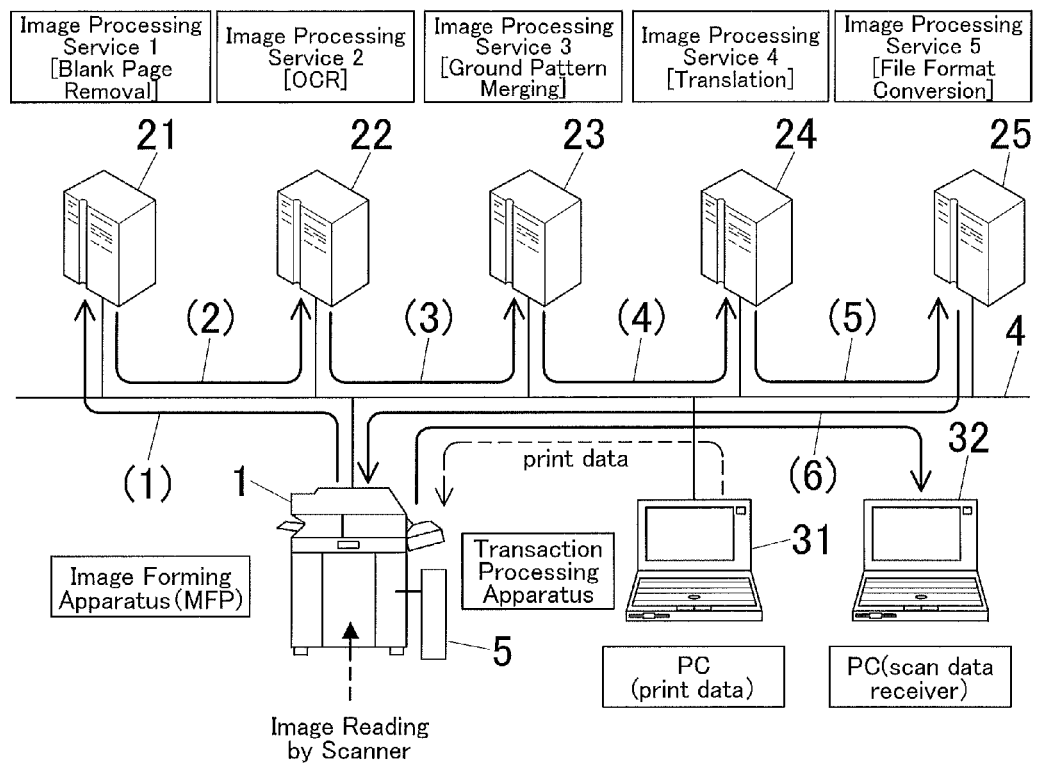
FIG. 1 is a view illustrating a configuration of an image processing system according to one embodiment.

FIG. 1 is a view illustrating a configuration of an image processing system according to one embodiment.

As illustrated in FIG. 1, the image processing system is provided with: an image forming apparatus 1; multiple image processing servers 21 to 25 (five image processing servers according to this embodiment); and multiple terminals 31 and 32 which are PCs owned by users, all of which are connected to each other via a network 4. Furthermore, the image forming apparatus 1 is connected to a transaction processing apparatus 5.

According to this embodiment, the multiple image processing servers 21 to 25 are configured to cooperatively performing their own image processing services on image data read out from a document by the image forming apparatus 1 or print data received from the terminals 31 and 32, in a predetermined order.

Specifically, the image processing server 21 performs a blank page removing operation as an image processing service 1, on the target image data. A charge for this service should be estimated based on the number of the target sides of sheets. That is, the reference item is the number of the target sides of sheets and the reference value for the reference item is the total number of the target sides of sheets in the target image data. Hereinafter, the target image data also will be referred to as "document image".

The image processing server 22 performs an Optical Character Recognition (OCR) operation as an image processing service 2, on the document image obtained by the blank page removing operation of the image processing server 21. In other words, the image processing server 22 performs an operation to extract text from the obtained document image and recognize individual characters therein. A charge for this service also should be estimated based on the number of the target sides of sheets. That is, the reference item is the number of the target sides of sheets and the reference value for the reference item is the total number of the target sides of sheets in the target document image.

The image processing server 23 performs an image merging operation, an operation to merge a ground pattern for example, as an image processing service 3, on the document image obtained by the blank page removing operation and the Optical Character Recognition operation of the image processing server 21 and the image processing server 22, respectively. A charge for this service also should be estimated based on the number of the target sides of sheets. That is, the reference item is the number of the target sides of sheets and the reference value for the reference item is the total number of the target sides of sheets in the target document image.

The image processing server 24 performs a translation operation as an image processing service 4, on the document image obtained by the image processing services of the image processing servers 21, 22, and 23. In other words, the image processing server 24 replaces the characters recognized by the Optical Character Recognition operation of the image processing server 22 with the translated text. A charge for this service should be estimated based on the number of characters. That is, the reference item is the number of characters and the reference value for the reference item is the total number of characters in the target document image.

The image processing server 25 performs file format conversion as an image processing service 5, on the document image obtained by the image processing services of the image processing servers 21 to 24. In other words, the image processing server 25 converts the target document image into a particular file format to transmit. A charge for this service should be estimated based on the size of document spaces. That is, the reference item is the size of document spaces and the reference value is the gross size of the document spaces in the target document image.

The image forming apparatus 1 makes the image processing servers 21 to 25 perform their own image processing services. The image forming apparatus 1, as which a MFP, a multifunctional digital machine is employed according to this embodiment, has a copier function, a scanner function, a facsimile (also referred to as FAX) function, a printer function, a memory function, and the like.

Figure 2:
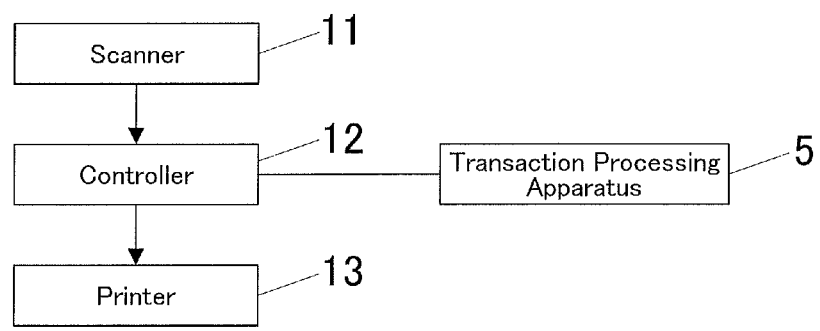
FIG. 2 is a block diagram illustrating a configuration of an image forming apparatus employed in the image processing system of FIG. 1.

FIG. 2 is a block diagram illustrating a configuration of the image forming apparatus 1.

The image forming apparatus 1 is provided with: a scanner 11 for reading an image of a document and converting it to image data, i.e. electronic data; a controller 12 for performing operations on the image data obtained by the scanner 11 and transmitting it to a printer 13; and a printer 13 for printing out on paper image data received from the controller 12.

Figure 3:
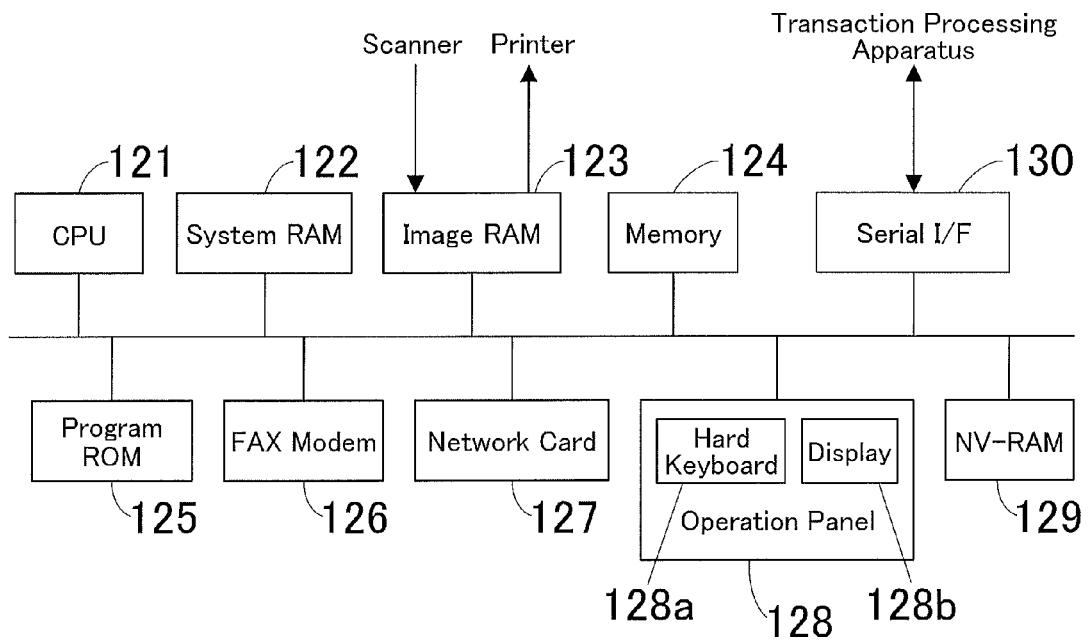
FIG. 3 is a block diagram illustrating in detail a controller of the image forming apparatus.

FIG. 3 is a block diagram illustrating in detail the controller 12 mentioned above.

The controller 12 is provided with: a CPU 121, a system RAM 122, an image RAM 123, a memory 124, a program ROM 125, a FAX modem 126, a network card 127, an operation panel 128, a NV-RAM 129, a serial interface (serial I/F) 130, and the like.

The CPU 121 integrally controls the entire image forming apparatus 1 by executing the various functions of the image forming apparatus 1 including a copier function, a printer function, a FAX function, and the like. Specifically, in this embodiment, the CPU 121 further performs the following control operations. Specifically, in this embodiment, the CPU 121 further performs the following control operations: generating service information indicating the user's specified order of multiple image processing services and estimation reference information (the both types of information will be detailed later); and transmitting the generated service information and estimation reference information to the image processing server 21 which is in charge of the first image processing service, separately from target image data.

The system RAM 122 cumulatively stores necessary data for the CPU 121 to execute operation programs, and temporarily keeps a memory area while the operation programs are active.

The image RAM 123 is a memory which temporarily stores image data received from the scanner 11 and the like.

A hard disk drive (HDD), for example, constitutes the memory 124; the memory 124 stores image data received from the scanner 11 or the like, application programs, and other data. Specifically, in this embodiment, the memory 124 further stores the details of the available image processing services obtained from the image processing servers 21 to 25, registered thereon.

The program ROM 125 is a memory which stores operation programs for the CPU 121. The program ROM 125 further stores programs to control the display and the key input on the operation panel 128, graphic data to display keys on a display 128b of the operation panel 128, "key management information" defining how to react with key presses.

The FAX modem 126 is a device which transmits and receives FAX; the network card 127 serves as a communicator which performs communication with the image processing servers 21 to 25 and external machines such as the terminals 31 and 32, via the network 4.

The operation panel 128, which is provided with a hard keyboard 128a including a Start key, a Stop key, a numeric keypad, and the like, allows users to operate the image forming apparatus 1; a display 128b, which is a liquid crystal display with touch-panel functionality, displays messages, operation status, and soft keys for users.

The NV-RAM 129 is a memory which stores nonvolatile information and the like specified by users.

The serial I/F 130 is an interface which transmits and receives charging information to and from a transaction processing apparatus 5.

The transaction processing apparatus 5 processes a transaction for an image processing service. More specifically, the image forming apparatus 1 estimates the total amount of charge for all the image processing services of the image processing servers, displays the total amount of charge on the display 128b of the operation panel 128, and transmits a notice of the total amount of charge to the transaction processing apparatus 5. The transaction processing apparatus 5 is configured to perform transaction processing when the user inserts as much money as the total amount of charge shown on the display, into the transaction processing apparatus 5.

When a copier function is executed on the image forming apparatus 1, image data obtained by the scanner 11 is temporarily stored on the image RAM 123. And then the image data is transmitted to the printer 13 to be printed out.

When a scanner function is executed on the image forming apparatus 1, image data obtained by the scanner 11 is temporarily stored on the image RAM 123. And the image data is read out by the CPU 121 to be encoded to an all-purpose image form. And then the image data can be externally transmitted over e-mail or FTP protocol from the network card 127.

When a FAX transmitting function is executed on the image forming apparatus 1, image data obtained by the scanner 11 is temporarily stored on the image RAM 123. And the image data is converted to a suitable resolution and a compressed form by the CPU 121 so as to be transmitted by FAX, then externally transmitted via the FAX modem 126.

When a FAX receiving function is executed on the image forming apparatus 1, image data received via the FAX modem 126 is temporarily stored on the image RAM 123. And the image data is converted to a suitable form by the CPU 121, then transmitted to the printer 13 to be printed out.

When a printer function is executed on the image forming apparatus 1, a page description language is developed in the image RAM 123 by the CPU 121, then transmitted to the printer 13 to be printed out.

The page description language may be stored on the memory 124 so as to be later printed out as many times as needed. When the user gives an instruction to store image data, image data stored on the image RAM 123 is transferred to the memory 124 to be stored.

The operations of the image forming apparatus 1 as described above, for example reading out image data and printing out print data, will not be further described in detail because they are well-known technologies for the image forming apparatus 1.

Figure 4:
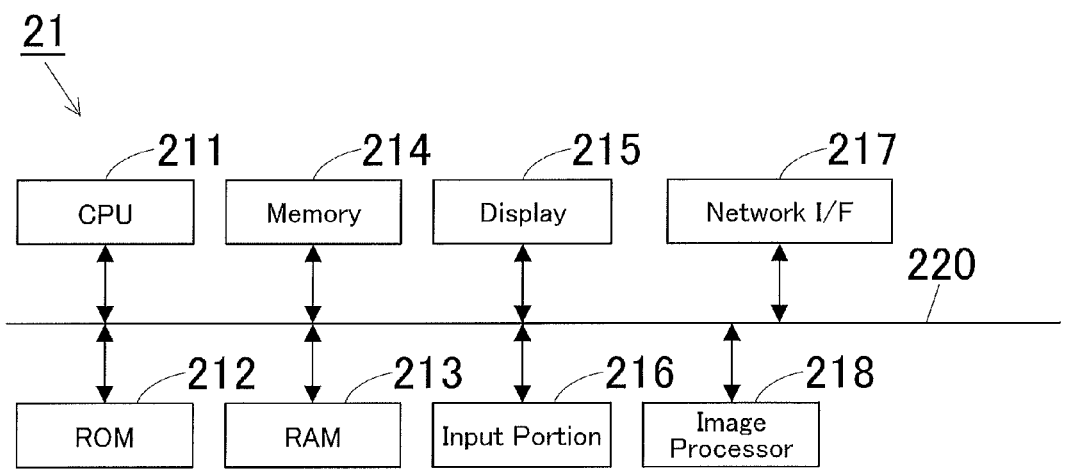
FIG. 4 is a block diagram illustrating a configuration of an image processing server.

FIG. 4 is a block diagram illustrating a configuration of the image processing servers 21 to 25. Hereinafter, a configuration of the image processing server 21 will be substantially described on behalf of the image processing servers 21 to 25, all of which have a common configuration.

An all-purpose computer constitutes the image processing servers 21; as illustrated in FIG. 4, the image processing server 21 is provided with: a CPU 211; a ROM 212; a RAM 213; a memory 214; a display 215; an input portion 216; a network interface (network I/F) 217; an image processor 218; and the like, all of which are connected to each other via a system bus 220.

The CPU 211 integrally controls the entire image processing server 21 by executing operation programs stored on a recording medium such as the ROM 212. Specifically, in this embodiment, the CPU 211 allows the image processor 218 to perform an image processing operation on a document image received from the image forming apparatus 1 or the image processing server in charge of the former image processing operation. And the CPU 211 transfers the image data obtained by the image processing operation, to the image processing server in charge of the next image processing operation. And the CPU 211 determines a value to be used for estimating an amount of charge for the image processing service to be performed on the document image by the image processor 218, and generates an estimation reference quantity indicating the determined value. Subsequently, the CPU 211 estimates an amount of charge for the image processing service of the image processor 218 based on the value previously determined by the image processing server in charge of the former image processing service (if there is such a value in the estimation reference information) and an amount of charge per unit set on the CPU 211 itself, and generates charge information indicating the estimated amount of charge. And then, the CPU 211 transfers the generated estimation reference quantity and charge information to the image processing server in charge of the next image processing service, separately from the document image. These operations later will be described in detail.

The ROM 212 is a recording medium which stores programs and other data for the CPU 211 to execute processing.

The ROM 213 is a recording medium which provides a work area for the CPU 211 to execute processing according to an operation program.

A hard disk drive, for example, constitutes the memory 214; the memory 214 stores application programs and other various types of data.

A CRT display or a liquid-crystal display constitutes the display 215; the display 215 displays various messages, entry accepting screens, selection screens, and other screens for users.

The entry portion 216, which serves users to perform input operations, is provided with a keyboard, a mouse, and the like.

The network interface 217 serves as a communicator which transmits and receives data with the image forming apparatus 1, the image processing servers 22 and 23, the terminals 31 and 32, and other external machines, via the network 4.

The image processor 218 performs a predetermined image processing operation on target image data under control of the CPU 211.

The following is the overview of the operations of the image processing system of FIG. 1.

Figure 5:
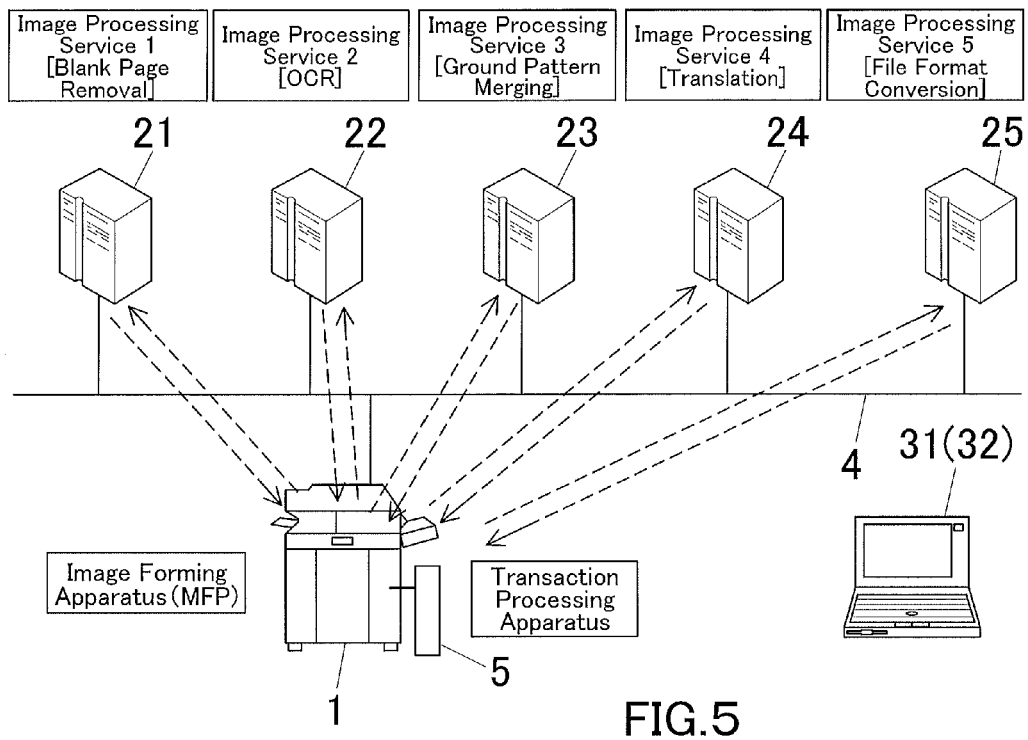
FIG. 5 is a view to explain how to register on the image forming apparatus the detail of the image processing services of the image processing servers.

Initially, as illustrated in FIG. 5, the image forming apparatus 1 obtains the details of the available image processing services by accessing the image processing servers 21 to 25 over HTTP protocol, and registers the available image processing services on the image forming apparatus 1 itself.

Figure 6:
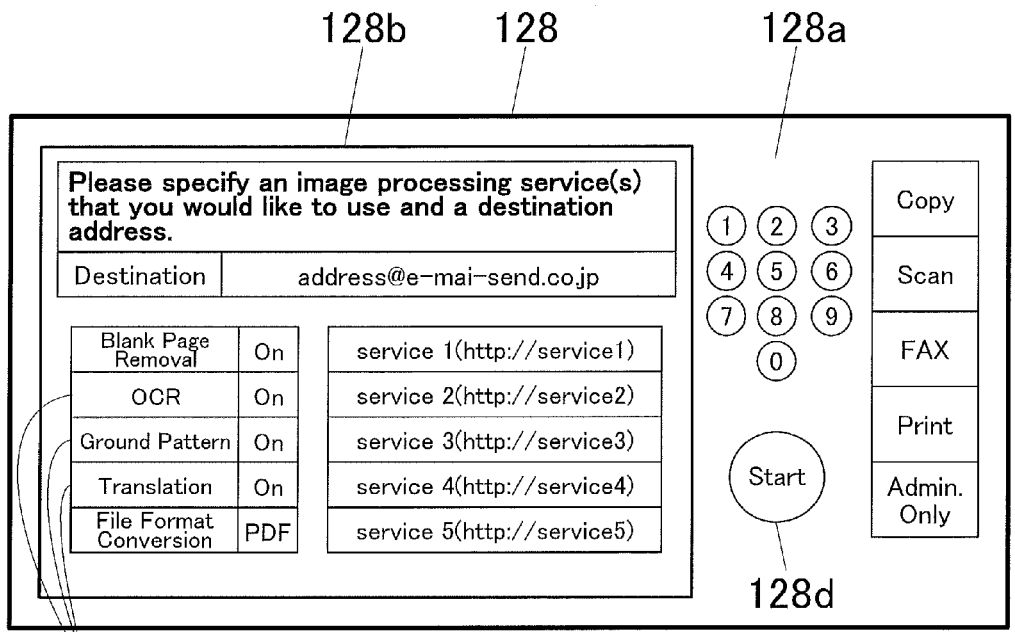
FIG. 6 is a plain view illustrating an operation panel which displays keys for selecting an image processing service.

When the available image processing services are successfully registered on the image forming apparatus 1, keys 128*c* for selecting an image processing service appear on the display 128*b* of the operation panel 128, as illustrated in FIG. 6. The user selects desirable image processing services and starts the operations by pressing the Start key 128*d*.

At the time of registration of the available image processing services, the image forming apparatus 1 receives from the image processing servers 21 to 25, notices of the "function", "location", "reference value (the number of the target sides of sheets, the number of characters, and the size of document spaces)", and the like of the available image processing services, then stores them on itself.

The image forming apparatus 1 generates service information which includes the user's specified image processing services and order information indicating the order of the image processing services.

FIG. 7 illustrates one example of service information. In this example, service information is a table containing the following items: the order of the image processing services; the addresses of the transfer ports of the image processing servers 21 to 25 in charge of the image processing services; the addresses of the information communication ports of the image processing servers 21 to 25, which serves to transmit the service information and the like other than the document image; the types of the image processing services; the reference items of the image processing servers 21 to 25; and amounts of charge for the image processing services. In other words, the service information includes all information from the image processing servers collectively. When estimating and determining an amount of charge for their own image processing services, the image processing servers 21 to 25 write the determined amount of charge in the relevant determined value field of the service information.

Figures 8, 9:
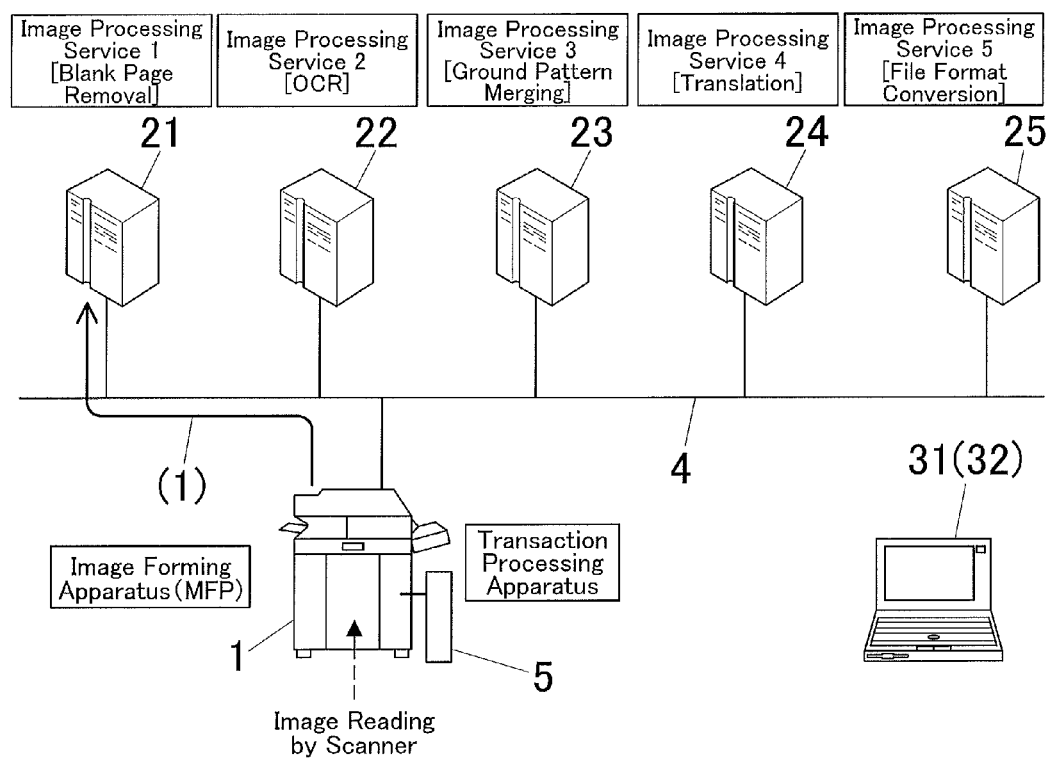
FIG. 8 is a view illustrating one example of estimation reference information.
FIG. 9 is a view to explain the overview of the operations of the image processing system.

As well as service information, the image forming apparatus 1 further generates estimation reference information as illustrated in FIG. 8. The estimation reference information is a table containing all types of reference items in the column of "reference item" of the service information and reference values determined for the reference items.

As indicated by Arrow [1] of FIG. 9, a document image inputted on the image forming apparatus 1 and the service information and the estimation reference information generated by the image forming apparatus 1 are transmitted to the image processing server 21 in charge of the first image processing service. After that, it is transferred to the image processing server 22 and further transferred to the image processing servers 23, 24, and then 25, according to the order of the image processing services indicated by the service information.

The image processing servers 21 to 25 transmit and receive the document image, the service information, and the estimation reference information via their own and different communication ports as previously described, which allows the service information and the estimation reference information to be transferred through different transfer routes between the image forming apparatus 1 and the image processing server 21 or 25 versus among the image processing servers 21 to 25, separately from the document image. That means the service information and the estimation reference information can be transferred prior to the document image, and the image processing servers 21 to 25 can determine an amount of charge before finishing their own image processing services as described below. Alternatively, the service information and the estimation reference information may be transferred through the same transfer route, separately from the document image.

Since the service information and the estimation reference information are transferred separately from the document image, it is necessary for the image forming apparatus 1 to give a job number to identify a series of the image processing services currently in process, to the document image, the service information, and the estimation reference information before transmitting them to the image processing server 21.

The image forming apparatus 1, which can generate service information and estimation reference information based on information having been kept therein, transmits the generated service information and estimation reference information to the image processing server 21 when the job is started, and transmits a document image to the image processing server 21 continuously while reading pages of a document one from another by the scanner 11.

In this case, when the job is started, the estimation reference information has the string "TBD" in the determined value field for all the reference items as illustrated in FIG. 10; when determining the number of sheets, the image forming apparatus 1 writes values next to the reference items: the number of the target sides of sheets and the size of document spaces in the estimation reference information as illustrated in FIG. 11, then transmits the estimation reference information to the image processing server 21. However, the determined values written by the image forming apparatus 1 may be changed by the image processing servers 21 to 25 as described below.

While receiving the document image, the service information, and the estimation reference information, the image processing server 21 performs its own image processing service, a blank page removing operation, on the document image, and simultaneously extracts the specification of the document image to estimate the number of the target sides of sheets. When the number of the target sides of sheets is determined, the image processing server 21 generates an estimation reference quantity indicating the determined number of the target sides of sheets. In this embodiment, estimation reference information already includes all the reference items collectively; the image processing server 21 generates an estimation reference quantity by writing the determined number of the target sides of sheets in the relevant determined value field of the estimation reference information. And then, the image processing server 21 transfers the estimation reference information with the determined value written therein to the image processing server 22 as indicated by Arrow [2] of FIG. 12.

Receiving estimation reference information including the determined values for the reference items while performing its own image processing service, the image processing server 21 compares the reference items of the estimation reference information to the capability of the image processing server 21 itself to confirm that: the image processing server 21 is capable of estimating the number of the target sides of sheets and the size of document spaces; and may change the current number of the target sides of sheets and size of document spaces after performing a blank page removing service. After performing a blank page removing service, the image processing server 21 keeps holding the estimation reference information as is without transferring it to any of the image processing servers 22 to 25 until determining the number of the target sides of sheets and the size of document spaces, because it may change the current ones in the estimation reference information. After determining the number of the target sides of sheets and the size of document spaces and overwriting the current values with the determined ones, the image processing server 21 transfers the estimation reference information to the image processing server 22 in charge of the next image processing service.

Figures 12, 13:
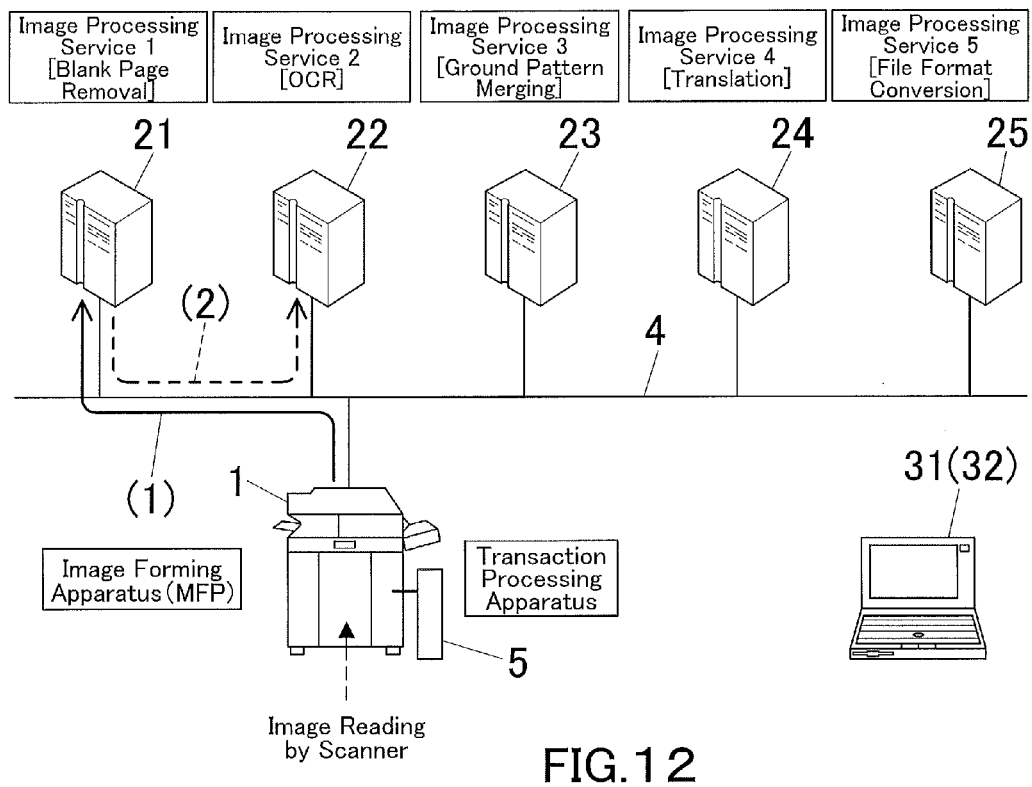
FIG. 12 is a view to explain the overview of the operations of the image processing system, continued from FIG. 9.
FIG. 13 is a view illustrating estimation reference information including the number of the target sides of sheets and the size of document spaces to be used for estimating an amount of charge, which are overwritten by the image processing server in charge of the first image processing service.

For example, after removing some blank pages from the document, the image processing server 21 determines the number of the target sides of sheets and the size of document spaces and changes the current values to the determined ones as illustrated in the estimation reference information of FIG. 13. After that, the image processing server 21 transfers the estimation reference information to the image processing server 22.

Meanwhile, the image processing server 21 estimates an amount of charge for the blank page removing operation based on the current determined number of the target sides of sheets included in the estimation reference information and an amount of charge per unit (an amount of charge per page) set on the image processing server 21 itself, and generates charge information indicating the estimated amount of charge. In this embodiment, the service information should include the amounts of charge for the image processing services of the image processing severs 21 to 25 collectively, the image processing server 21 therefore generates charge information by writing the estimated amount of charge into the service information as illustrated in FIG. 14. And then, the image processing server 21 transfers the service information with the estimated amount of charge being written therein, to the image processing server 22.

Meanwhile, after transferring the estimation reference information and the service information to the image processing server 22, the image processing server 21 further transfers thereto the document image obtained by the blank page removing operation.

Receiving the estimation reference information and the service information, the image processing server 22 compares the reference items of the estimation reference information to the capability of the image processing server 22 itself to confirm that the image processing server 22 is capable of estimating the number of characters. And the image processing server 22 waits until receiving the document image from the image processing server 21, and when receiving the document image, it starts performing an Optical Character Recognition operation on the document image. The image processing server 22 determines the number of characters by the Optical Character Recognition operation and writes the determined value in the "number of characters" determined value field of the estimation reference information as illustrated in FIG. 15. And then, the image processing server 22 transfers the estimation reference information to the image processing server 23 in charge of the next image processing service as indicated by Arrow [3] of FIG. 1.

Meanwhile, the image processing server 22 estimates an amount of charge for the Optical Character Recognition operation based on the current determined number of the target sides of sheets included in the estimation reference information and an amount of charge per unit set on the image processing server 22 itself, and as illustrated in FIG. 16, writes the estimated amount of charge into the service information. And then, the image processing server 22 transfers the service information to the image processing server 23. After that, the image processing server 22 further transfers the document image obtained by the Optical Character Recognition operation, to the image processing server 23.

Prior to the document image, the image processing server 23 receives the estimation reference information and the service information. And the image processing server 23 compares the reference items of the estimation reference information to the capability of the image processing server 23 itself to confirm that: the image processing server 23 is capable of estimating the number of the target sides of sheets and the size of document spaces; and will not change the current determined number of the target sides of sheets and size of document spaces after performing an image merging operation. And then, the image processing server 23 transfers the estimation reference information to the image processing server 24 in charge of the next image processing service as indicated by Arrow [4] of FIG. 1.

Meanwhile, the image processing server 23 estimates an amount of charge for the image merging operation based on the current determined number of the target sides of sheets included in the estimation reference information and an amount of charge per unit set on the image processing server 23 itself, and as illustrated in FIG. 17, writes the estimated amount of charge into the service information. And then, the image processing server 23 transfers the service information to the image processing servers 24. After that, the image processing server 23 further transfers the document image obtained by the image merging operation, to the image processing server 24.

In the same way as described above, the image processing servers 24 and 25 compare the reference items of the estimation reference information to the capability of the image processing servers 24 and 25 themselves to confirm that: the image processing servers 24 and 25 are capable of estimating the number of the target sides of sheets and the size of document spaces; and will not change the current determined number of the target sides of sheets and size of document spaces because the image processing servers 24 and 25 are in charge of translation and file format conversion, respectively. And then, the image processing servers 24 and 25 transfer the estimation reference information to the image processing server 25 in charge of the next image processing service as indicated by Arrow [5] of FIG. 1 and to the image forming apparatus 1 as indicated by Arrow [6] of FIG. 1, respectively.

Meanwhile, the image processing servers 24 and 25 estimate an amount of charge for translation and file format conversion based on the current determined number of characters and size of document spaces and an amount of charge per unit set on the image processing servers 24 and 25 themselves, respectively, and write the estimated amount of charge into the service information. And then, the image processing server 24 and 25 transfer the service information to the image processing server 25 and the image forming apparatus 1 as indicated by Arrows [5] and [6] of FIG. 1, respectively.

In this way as described above, the image processing servers 21 to 25 writes the amounts of charge for their own image processing services into the service information, and eventually the service information is returned to the image forming apparatus 1. Meanwhile, after transferring the estimation reference information and the service information to the image forming apparatus 1, the image processing server 25 further transfers thereto the document image having been processed by the image processing servers 21 to 25.

Figure 18A:
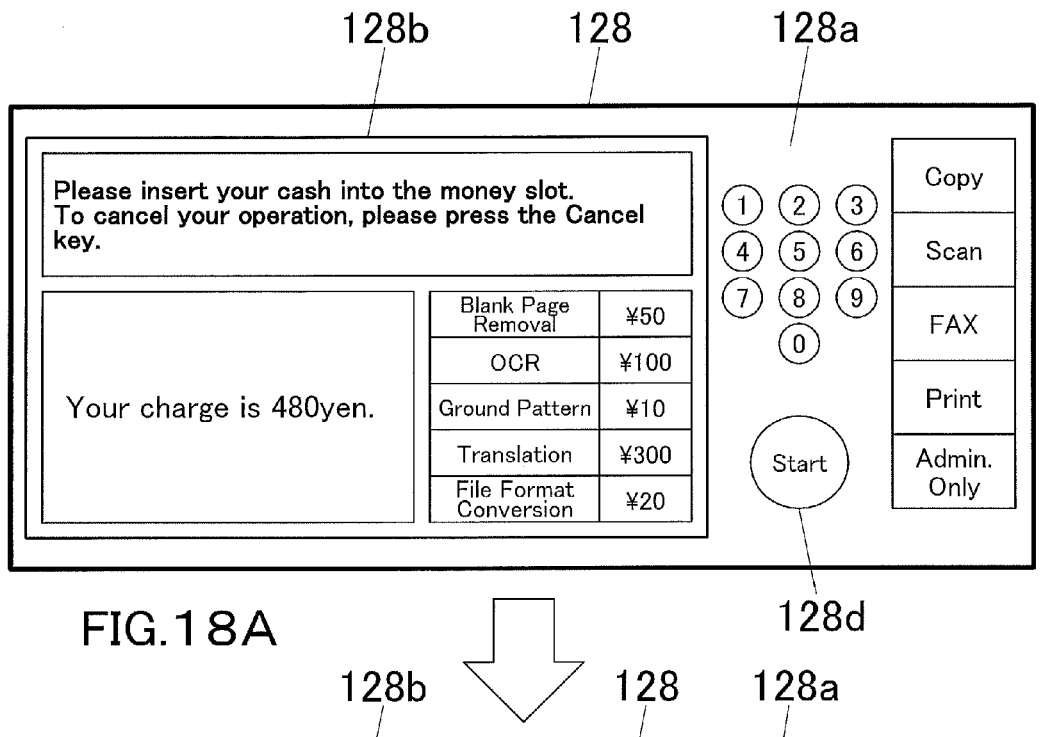
FIG. 18 is a view illustrating a display screen to appear on an operation panel of the image forming apparatus when a transaction is processed.
Figure 18B:
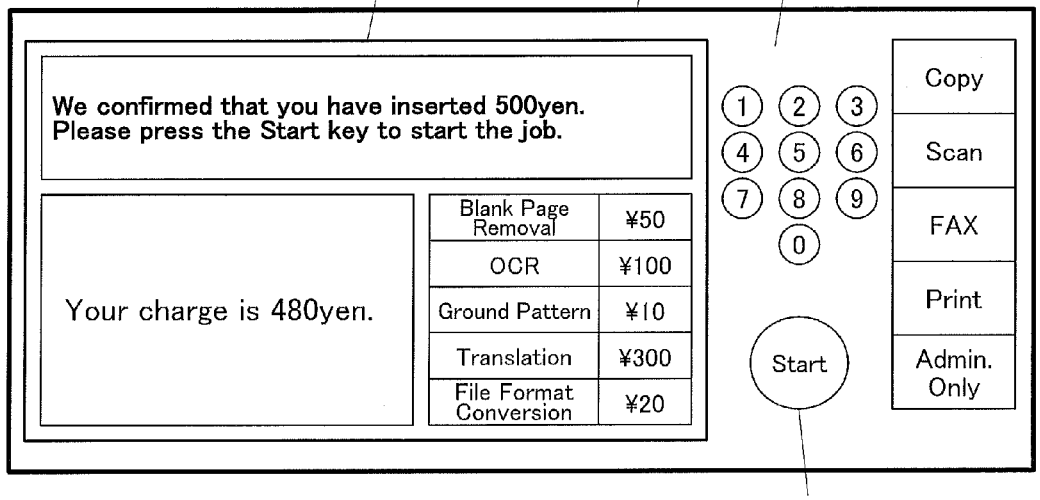

Receiving the estimation reference information and the service information prior to the document image, the image forming apparatus 1 can add up all the amounts of charge written in the service information, which means that the transaction processing apparatus 5 can charge the total amount before the image forming apparatus 1 receives the document image. Specifically, by communicating the transaction processing apparatus 5 which is connected to the serial interface 130, the image forming apparatus 1 transmits thereto a notice of the total amount of charge while displaying a message requesting the user to insert as much money as the total amount of charge shown on the display 128b of the operation panel 128 as illustrated in FIG. 18A. When the user inserts as much money as the total amount of charge, the transaction processing apparatus 5 performs transaction processing. After that, the image forming apparatus 1 switches the display screen appearing on the display 128b of the operation panel 128 to the next one as illustrated in FIG. 18B.

Figure 19:
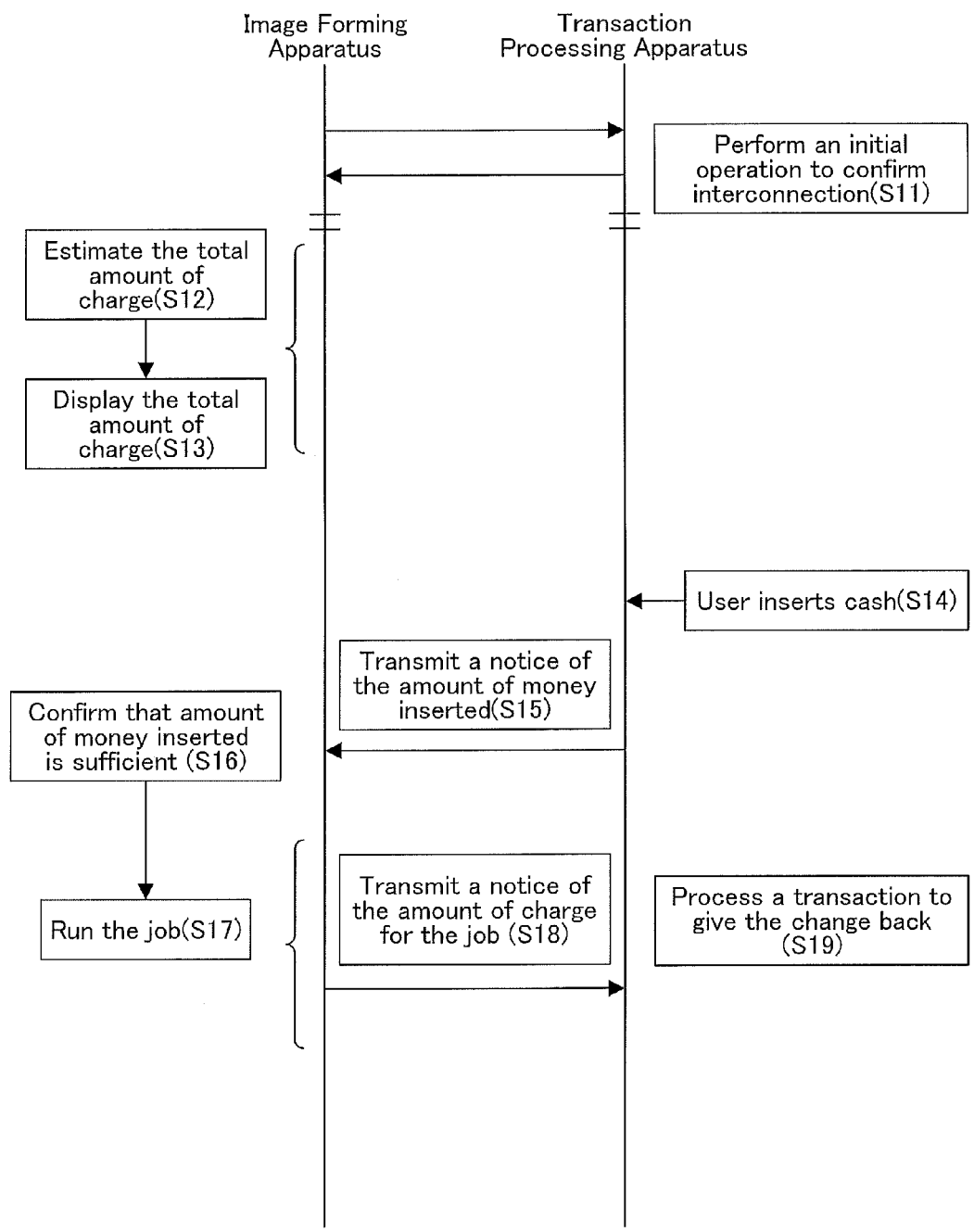
FIG. 19 is a flowchart representing a procedure to process a transaction, which is implemented over a serial communication between the image forming apparatus and the transaction processing apparatus.

FIG. 19 is a flowchart representing a procedure to process a transaction, which is implemented over a serial communication between the image forming apparatus 1 and the transaction processing apparatus 5.

When being provided with power, the image forming apparatus 1 and the transaction processing apparatus 5 perform an initial operation to confirm interconnection because these are independently constructed (Step S11). In this embodiment, before the image processing servers perform their image processing services, the image forming apparatus 1 estimates the total amount of charge (Step S12), then displays the total amount of charge on the display 128b of the operation panel 128 (Step S13).

More specifically, the image forming apparatus 1 can display the total amount of charge as soon as receiving service information as previously mentioned.

Everytime the user inserts cash into the money slot (Step S14), the transaction processing apparatus 5 transmits a notice of the amount of money inserted, to the image forming apparatus 1 (Step S15). The image forming apparatus 1 displays the amount of money inserted, on the display 128b of the operation panel 128.

If the amount of money inserted is equal to or greater than the total amount of charge, the image forming apparatus 1 is allowed to run a job (for example, a job to transmit a processed document image to a predetermined address) to the network with the pressing of the Start key 128d.

The image forming apparatus 1 confirms that the amount of money is equal to or greater than the total amount of charge (Step S16), runs the job (Step S17), and transmits a notice of the total amount of charge to the transaction processing apparatus 5 (Step S18). The transaction processing apparatus 5 processes a transaction to give the change back to the user (Step S19).

Hereinafter, the operations of the image forming apparatus 1, and the image processing servers 21 to 25 will be further described with reference to flowcharts.

The image forming apparatus 1 performs all operations under control of the CPU 121 according to an operation program stored on the program ROM 125 as described above.

Figure 20:
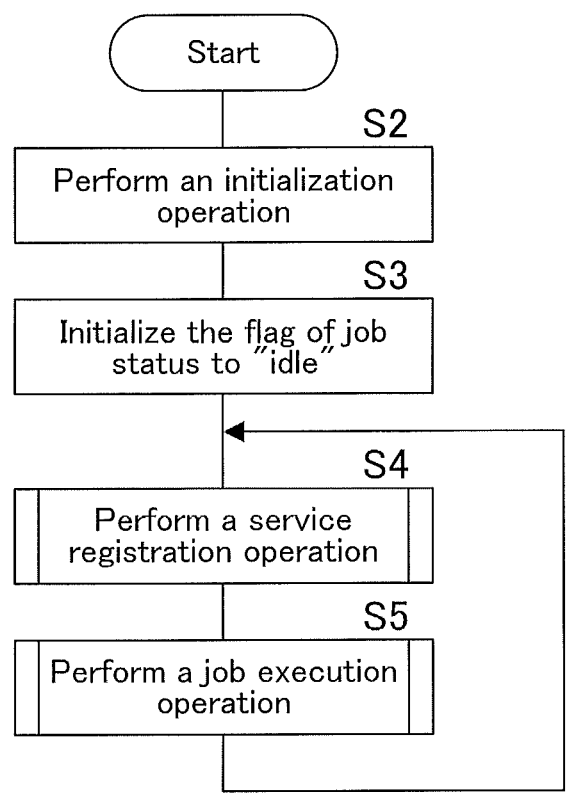
FIG. 20 is a flowchart representing a main processing routine of the image forming apparatus.

As illustrated in FIG. 20, when being provided with power, the image forming apparatus 1 performs an initialization operation, for example initializes the internal program or the hardware (Step S2). Subsequently, the image forming apparatus 1 initializes "job status" representing the status of the job to "idle" (Step S3), registers the available image processing services of the image processing servers 21 to 25 on the image forming apparatus 1 itself (Step S4), and runs the job (Step S5). And the image forming apparatus 1 repeats the operations of registering the available image processing services (Step S4) and running the job (Step S5).

Figure 21:
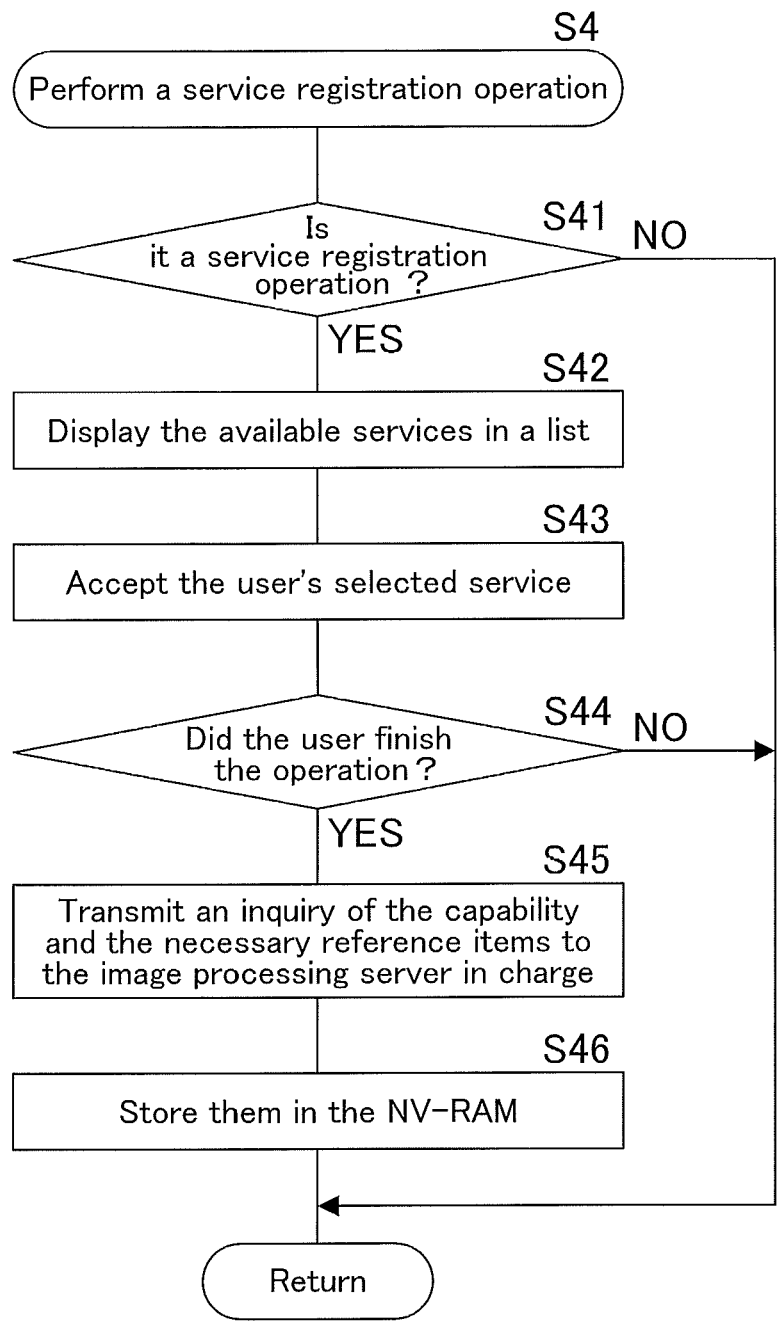
FIG. 21 is a flowchart representing a sub processing routine corresponding to a service registration operation (Step S4) in FIG. 20.

FIG. 21 is a flowchart representing a sub processing routine corresponding to a service registration operation (Step S4) in FIG. 20. It should be noted that an administrator user is required to preliminarily register the available image processing services on the image forming apparatus 1.

In Step S41, it is judged whether or not what is intended via the operation panel 128 is a service registration operation. If it is not a service registration operation (NO in Step S41), the sub processing routine returns to the main processing routine. If it is a service registration operation (YES in Step S41), the available image processing services having been registered on the image forming apparatus 1 appear in a list (the registered items can be updated). The user selects a desirable image processing service, then the selected image processing service is accepted in Step S43. And according to user manipulation, it is judged whether or not the selection is finished in Step S44. If the selection is not finished (NO in Step S44), the sub processing routine returns to the main processing routine. If the selection is finished (YES in Step S44), an inquiry of the capability about the selected image processing service and the necessary reference items for transaction processing is transmitted to the image processing server in charge in Step S45, and the obtained information is stored on the NV-RAM 129 in Step S46.

Figure 22:
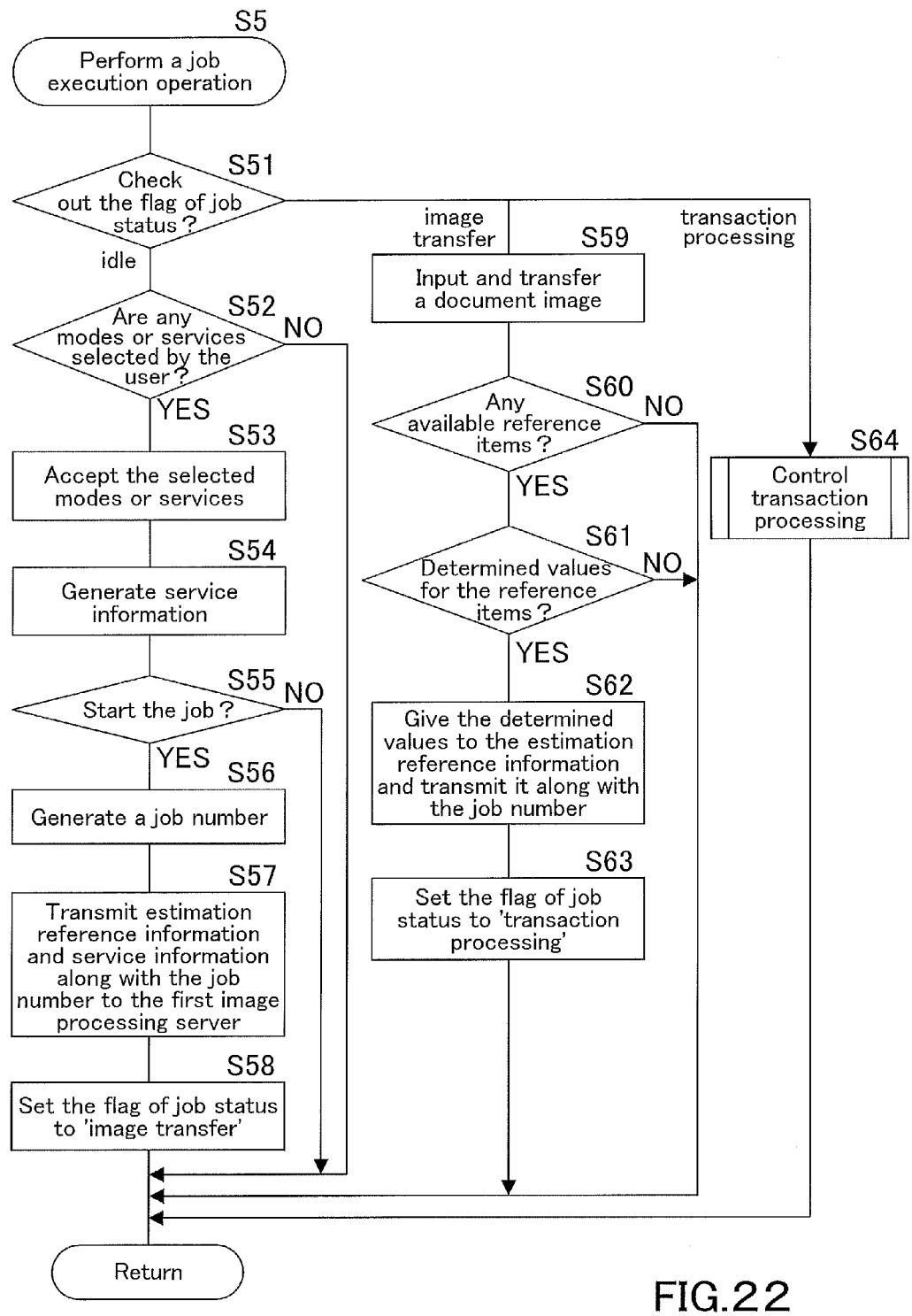
FIG. 22 is a flowchart representing a sub processing routine corresponding to a job execution operation (Step S5) in FIG. 20.

FIG. 22 is a flowchart representing a sub processing routine to select desirable image processing services and execute the jobs accordingly, corresponding to the job execution operation (Step S5) in FIG. 21.

The flag of "job status" is checked out, and the sub processing routine proceeds to different steps depending on the job status: "idle", "image transfer", or "transaction processing", in Step S51.

If the flag of "job status" is "idle" in Step S51, it is judged in Step S42 whether or not any modes or image processing services are selected by the user via the operation panel 128. If no modes or image processing services are selected (NO in Step S52), the sub processing routine returns to the main processing routine. If any modes or image processing services are selected (YES in Step S52), the modes or image processing services selected via the operation panel 128 are accepted in Step S53, and estimation reference information and service information are generated in Step S54.

Subsequently, it is judged in Step S55 whether or not the Start key is pressed by the user, in other words, there is an instruction to start the job. If there is no such instruction (NO in Step S55), the sub processing routine returns to the main processing routine. If there is an instruction to start the job (YES in Step S55), a job number is generated in Step S56, and the sub processing routine proceeds to Step S57, in which the job number is given to the estimation reference information and the service information generated in Step S54 and the estimation reference information and the service information with the job number being given thereto are transmitted to the image processing server 21 in charge of the first image processing service. After that, the flag of "job status" is switched to "image transfer" in Step S58, and the sub processing routine returns to the main processing routine.

If the flag of "job status" is "image transfer" in Step S51, the sub processing routine proceeds to Step S59, in which an inputted document image is transmitted to the network. The inputted document image may be image data read out from a document by the scanner 11 or print image received from the terminal 31 or 32.

After the document image is transmitted to the network, it is judged in Step S60 whether or not the estimation reference information includes any reference items for which values can be determined by the image forming apparatus 1. If it does not include any such reference items (NO in Step S60), the sub processing routine returns to the main processing routine. If it includes such reference items (YES in Step S60), then it is judged in Step S61 whether or not values for the reference items have been determined. If no values for the reference items have been determined (NO in Step S61), the sub processing routine returns to the main processing routine. If values for the reference items have been determined (YES in Step S61), the sub processing routine proceeds to Step S62, in which the determined values are given to the estimation reference information and the estimation reference information with the job number attached thereto is transmitted to the image processing server 21 in charge of the first image processing service.

After that, the flag of "job status" is switched to "transaction processing" in Step S63, and the sub processing routine returns to the main processing routine.

If the flag of "jog status" is "transaction processing" in Step S51, the sub processing routine proceeds to Step S64 to perform a transaction processing operation, then returns to the main processing routine.

Figure 23:
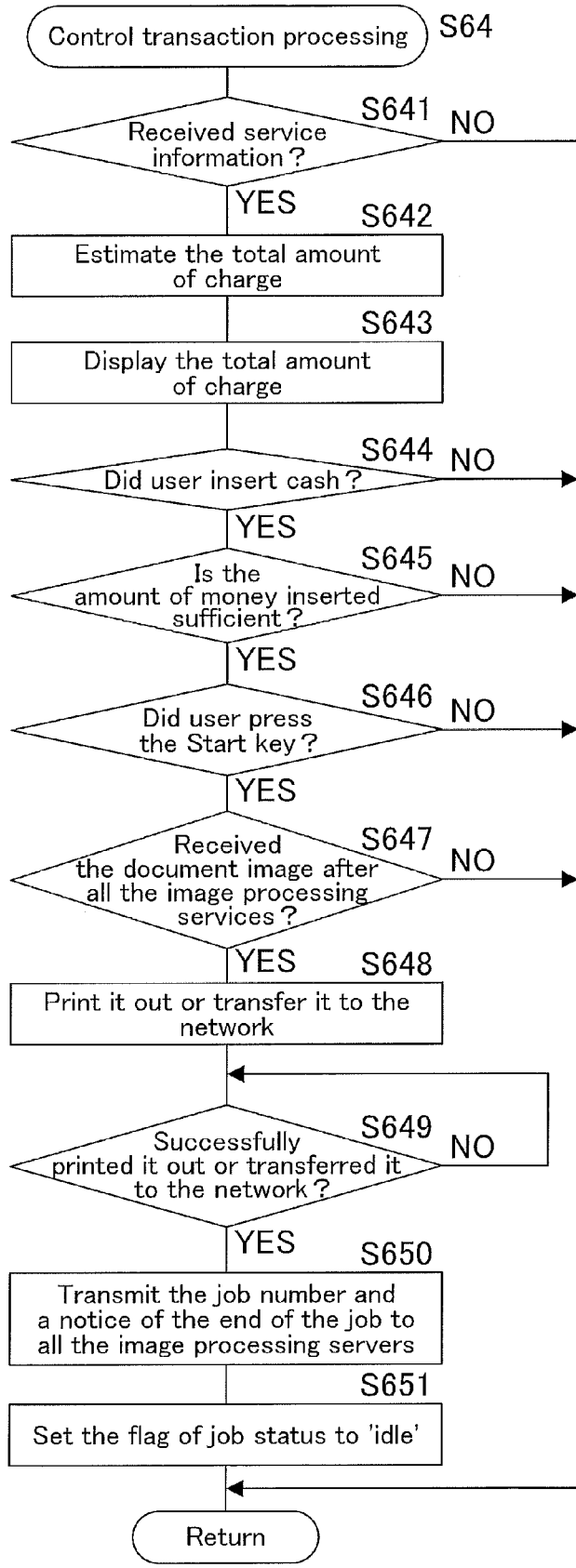
FIG. 23 is a flowchart representing a sub processing routine corresponding to a transaction processing operation (Step S64) in FIG. 22.

FIG. 23 is a flowchart representing a sub processing routine corresponding to the transaction processing operation (Step S64) in FIG. 22.

In Step S641, it is judged whether or not the service information has been received from the image processing server 25 in charge of the last image processing service. If it has not been received yet (NO in Step S641), the sub processing routine returns to the main processing routine. If it has been received (YES in Step S641), the amounts of charge are added up in Step S642, and the total amount of charge is shown on the display 128*b* of the operation panel 128 in Step S643.

And in Step S644, it is judged whether or not cash has been inserted into the money slot. If cash has not been inserted yet (NO in Step S644), the sub processing routine returns to the main processing routine. If cash has been inserted (YES in Step S644), then it is judged in Step S645 whether or not the amount of money inserted is equal to or greater than the total amount of charge. If it is less than the total amount of charge (NO in Step S645), the sub processing routine returns to the main processing routine.

If it is equal to or greater than the total amount of charge (YES in Step S645), then it is judged in Step S646 whether or not the Start key 128*d* is pressed. If it is not pressed (NO in Step S646), the sub processing routine returns to the main processing routine. If it is pressed (YES in Step S646), then it is judged in Step S647 whether or not the document image has been received after all the image processing services.

If it has not been received yet (NO in Step S647), the sub processing routine returns to the main processing routine. If it has been received (YES in Step S647), it is printed out or transferred to the network in Step S648. After that, the sub processing routine proceeds to Step S649. Having paid the total amount of charge before arriving at this step, the user does not have to stay by the side of the image forming apparatus 1 anymore in the case where the document image is transferred to the network.

In Step S649, the sub processing routine waits until the printing operation or the transfer operation is finished (NO in Step S649). If it is finished (YES in Step S649), the job number and a notice of the end of the job are transmitted to the image processing servers 21 to 25 in Step S650, and the flag of "job status" is switched to "idle" in Step S651. After that, the sub processing routine returns to the main processing routine.

Figure 24:
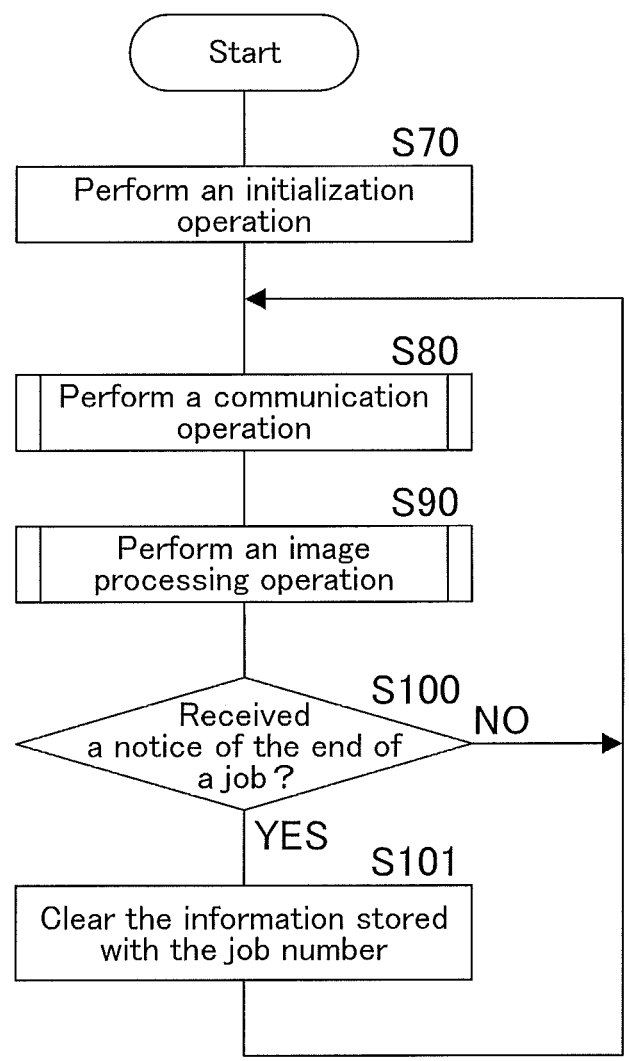
FIG. 24 is a flowchart representing a main processing routine of the image processing servers.
Figure 25:
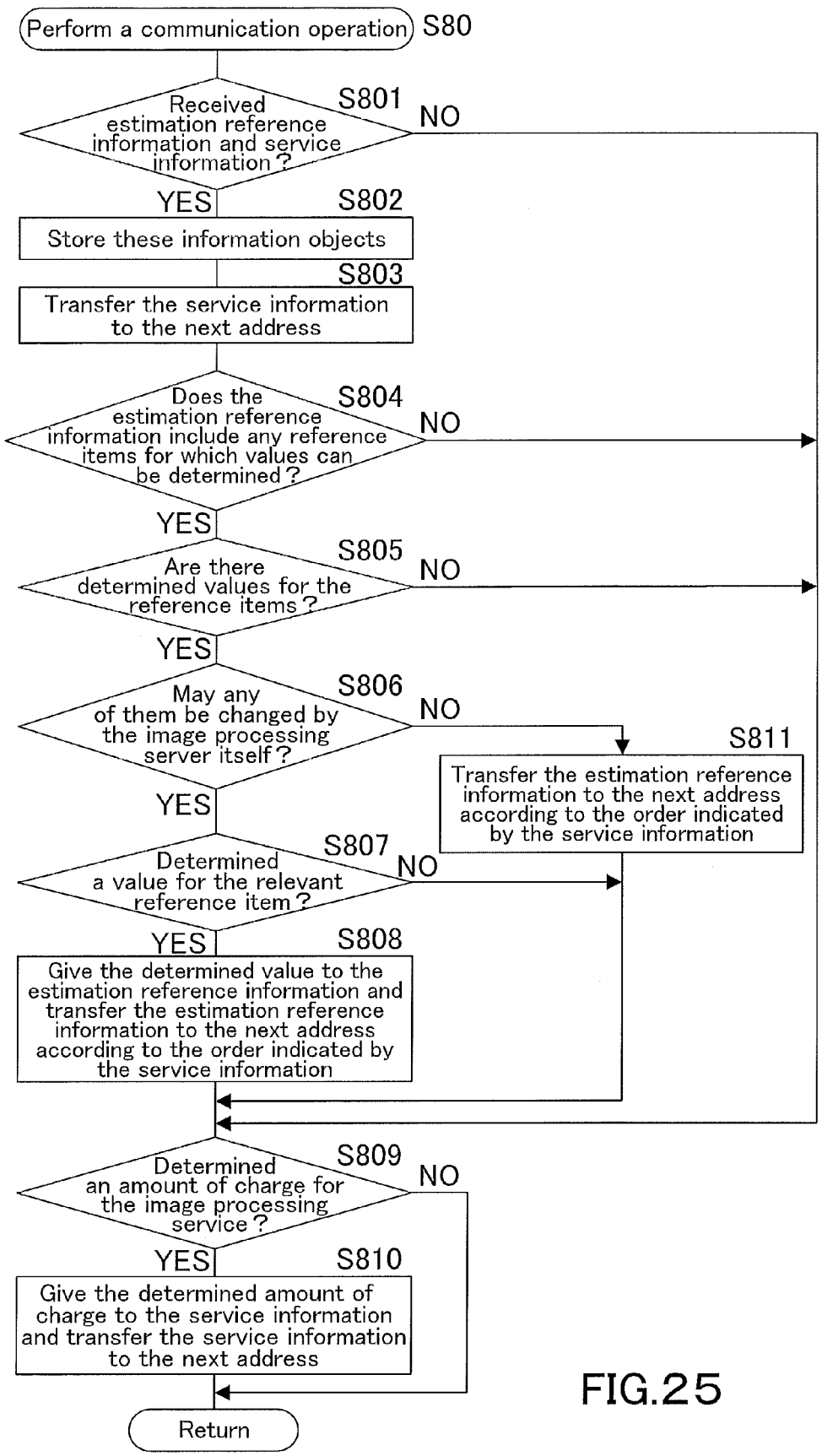
FIG. 25 is a flowchart representing a sub processing routine corresponding to a communication operation (Step S80) in FIG. 24.
Figure 26:
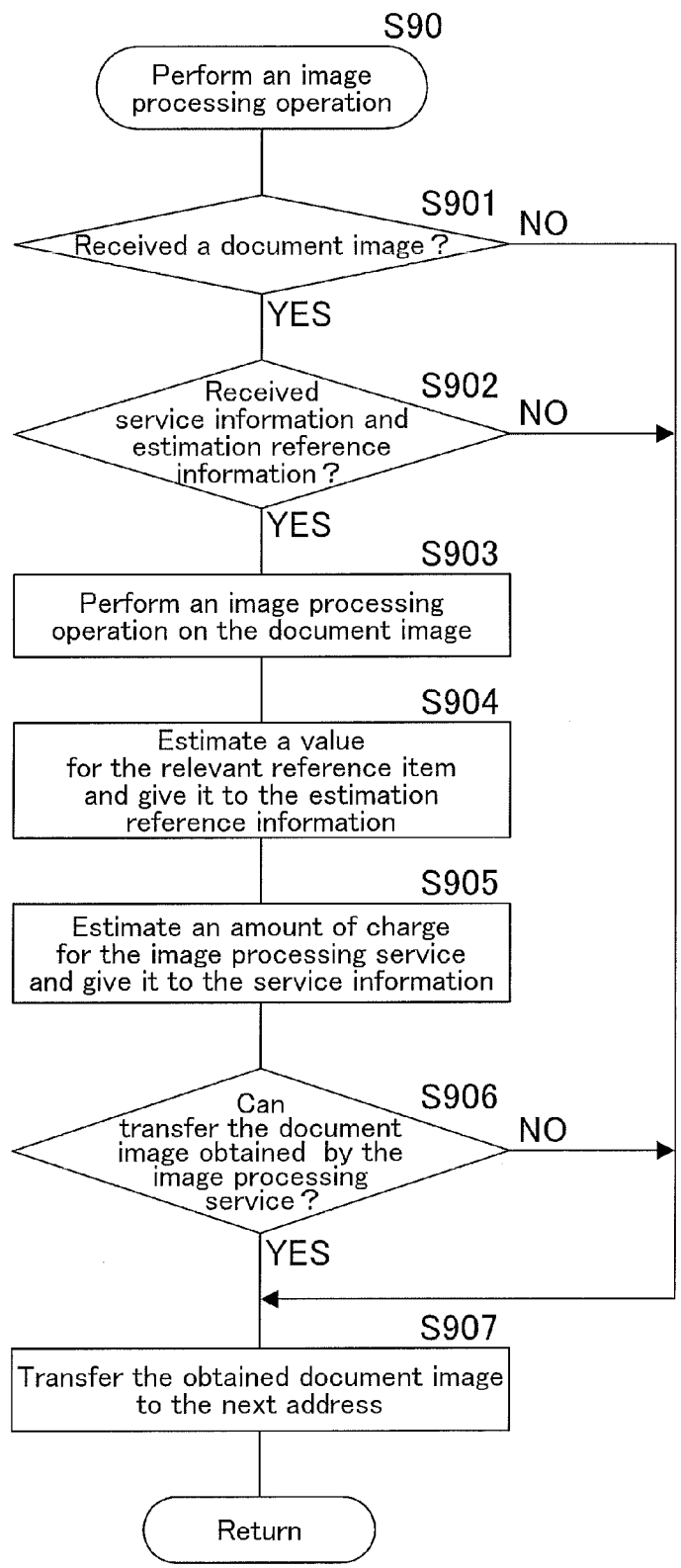
FIG. 26 is a flowchart representing a sub processing routine corresponding to an image processing operation (Step S90) in FIG. 24.
Figure 27:
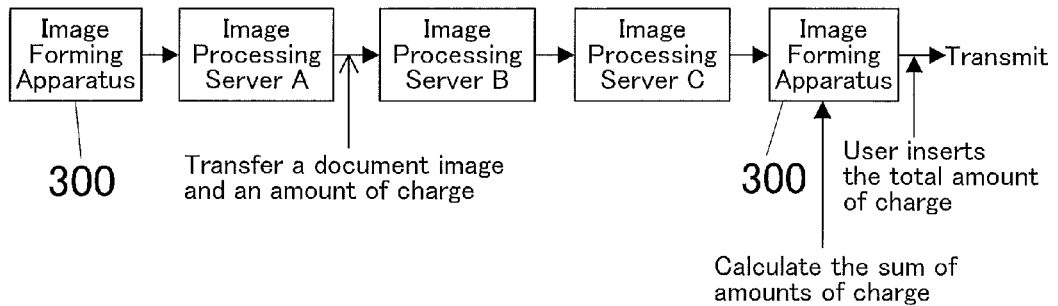
FIG. 27 is a view to explain the problems with a conventional image processing system.
Figure 28:
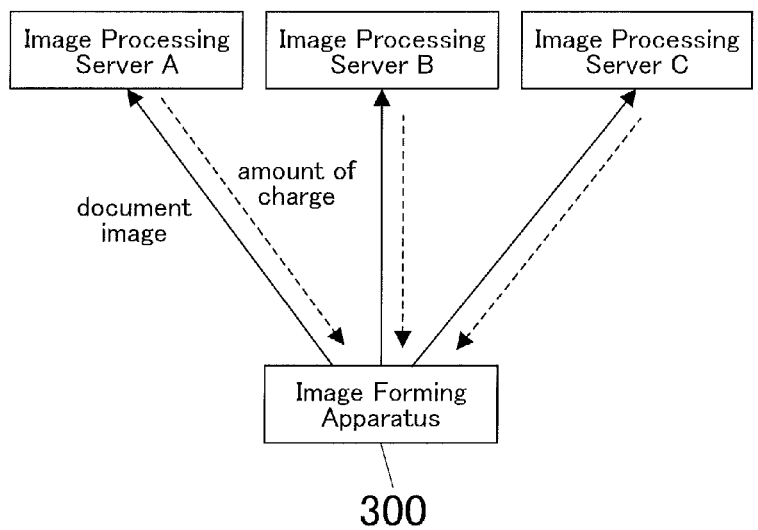
FIG. 28 is a view to explain the problems with another conventional image processing system.

FIGS. 24 to 26 are flowcharts to further describe the operations of the image processing servers 21 to 25. The image processing servers 21 to 25 perform all operations under control of their own CPUs 211 according to operation programs stored on their own recording mediums such as the ROMs 212 or the memories 214.

FIG. 24 is a flowchart representing a main processing routine of the image processing servers 21 to 25.

The image processing servers 21 to 25 individually perform an initialization operation (Step S70), a communication operation (Step S80), and an image processing operation (Step S90). After that, it is judged in Step S100 whether or not a notice of the end of a job has been received from the image forming apparatus 1. If it has not been received yet (NO in Step S100), the main processing routine returns to Step S80. If it has been received (YES in Step S100), the information stored with the job number is cleared in Step S101.

Here, the image processing servers 21 to 25 may be configured to perform the communication operation (Step S80) and the image processing operation (Step S90) in another process.

FIG. 25 is a flowchart representing a sub processing routine corresponding to the communication operation (Step S80) in FIG. 24.

In Step S801, it is judged whether or not the estimation reference information and the service information have been received. If these information objects have not been received yet (NO in Step S801), the sub processing routine proceeds to Step S809; if these information objects have been received (YES in Step S801), both of them are stored on the memory 213 in Step S802, and then the service information is transferred to the next address in Step S803.

Subsequently, it is judged in Step S804 whether or not the estimation reference information includes any reference items for which values can be determined. If there are no such reference items (NO in Step S804), the sub processing routine proceeds to Step S809. If there are any such reference items (YES in Step S804), the sub processing routine proceeds to Step S805.

In Step S805, it is judged whether or not there are determined values for the reference items. If there are no determined values for the reference items (NO in Step S805), the sub processing routine proceeds to Step S809. If there are determined values for the reference items (YES in Step S805), then it is judged in Step S806 whether or not any of them may be changed by the image processing server itself.

If none of them will be changed (NO in Step S806), the estimation reference information is transferred to the image processing server in charge of the next image processing service according to the order of the image processing services indicated by the service information in Step S811. After that, the sub processing routine proceeds to Step S809. If any of them may be changed (YES in Step S806), then it is judged in Step S807 whether or not a value for the relevant reference item has been estimated and determined by the image processing server itself. If such a value has not been determined yet (NO in Step S807), the sub processing routine proceeds to Step S809. If such a value has been determined (YES in Step S807), the sub processing routine proceeds to Step S808 in which the determined value is given to the estimation reference information and the estimation reference information is transferred to the image processing server in charge of the next image processing service according to the order of the image processing services indicated by the service information. After that, the sub processing routine proceeds to Step S809.

In Step S809, it is judged whether or not the amount of charge for the image processing service of the image processing server itself has been determined. If it has not been determined yet (NO in Step S809), the sub processing routine returns to the main processing routine. If it has been determined (YES in Step S809), the determined amount of charge is given to the service information and the service information is transferred to the next address in Step S810. After that, the sub processing routine returns to the main processing routine.

FIG. 26 is a flowchart representing a sub processing routine corresponding to the image processing operation (Step S90) in FIG. 24. In Step S90, an image processing operation is performed on the document image; a value for the relevant reference item is estimated based on the document image; and the determined value is given to the estimation reference information.

In Step S901, it is judged whether or not the document image has been received. If it has not been received yet (NO in Step S901), the sub processing routine returns to the main processing routine. If it has been received (YES in Step S901), then it is judged in Step S902 whether or not the service information and the estimation reference information have been received.

If these information objects have not been received yet (NO in Step S902), the sub processing routine returns to the main processing routine. If these information objects have been received (YES in Step S902), an image processing operation is performed on the document image in Step S903. Subsequently, a value for the relevant reference item is estimated and given to the estimation reference information in Step S904, and an amount of charge for the image processing service is estimated and given to the service information in Step S905.

Then in Step S906, it is judged whether or not the document image obtained by the image processing service can be transferred to the next address. If the document image cannot be transferred (NO in Step S906), the sub processing routine returns to the main processing routine. If the document image can be transferred (YES in Step S906), it is transferred to the next address in Step S907, and the sub processing routine returns to the main processing routine.

In this embodiment having been described above: estimation reference information and service information are transmitted separately from a document image; amounts of charge for the image processing services of the image processing servers 22, 23, and 25 are determined based on the number of the target sides of sheets and the size of document spaces determined by the image processing server 21, while an amount of charge for the image processing service of the image processing server 24 is determined based on the number of characters determined by the image processing server 22. Therefore, the image processing servers 22 to 25 are allowed to estimate relevant amounts of charge for their own image processing services rapidly before performing the image processing services on the document image; and the transaction processing apparatus 5 is allowed to process a transaction rapidly before the image processing servers 22 to 25 perform the image processing services.

In this embodiment, there is the inconvenience that the image processing servers may update a charge information table during the time difference, i.e. after estimating an amount of charge before performing an image processing service, causing the transaction processing apparatus charge the total amount which may be at variance with the actual performance of the image processing services. To prevent this inconvenience, it is desirable to charge the total amount for a predetermined period of time since it is determined.

The embodiment has been described in the foregoing specification, which does not mean that the present invention shall be construed as limited to the particular forms disclosed.

For example, in this embodiment, the image forming apparatus 1 transmits service information indicating the order of image processing services to the image processing server 21, and the image processing servers 21 to 25 transfer the service information, a document image, and estimation reference information to the next address according to the order indicated by the service information. Alternatively, the image forming apparatus 1 may serve as an intermediate machine to transfer the service information, a document image, and estimation reference information to the next address: while the image forming apparatus 1 transfers these information objects to the image processing server in charge of the next image processing service, the image processing servers 21 to 25 individually return them to the image forming apparatus 1.

Furthermore, in the embodiment having been described above, receiving the document image from the image processing server 25 in charge of the last image processing service, the image forming apparatus 1 prints it out or transfers it to a predetermined address after the transaction processing apparatus 5 successfully finishes a transaction processing operation. Alternatively, the image processing server 25 or the like may transfer the document image directly to a predetermined address after the transaction processing apparatus 5 successfully finishes a transaction processing operation. In this case, when a sufficient amount of money is entered to the transaction processing apparatus 5, the image processing server 25 or the like transfers the document image to a predetermined address according to transfer permission information given by the image forming apparatus 1.

Furthermore, in this embodiment, the image processing servers 21 to 25 transfer a document image, estimation reference information, and service information to the next address via the network 4. Alternatively, a database server storing these information objects may be provided; the image processing servers 21 to 25 use these information objects stored on the database server when transferring them.

Furthermore, in this embodiment, determined values for all reference items are written into estimation reference information collectively; amounts of charge for all image processing services are written into service information collectively. Alternatively, determined values for all reference items and amounts of charge for all image processing services may be transferred one by one as individual information objects.

If there is the need to change the current determined values given by the image processing server 21 based on their own image processing services, the image processing servers 22 to 25 may estimate new values for the relevant reference items and overwrite the current values with the new ones. In this way as described above, amounts of charge can be estimated with higher accuracy.

The present invention of the subject application having been described above may be applied to the following modes.

[1] An image processing system comprising: an image forming apparatus; first and second image processing servers being connected to the image forming apparatus via a network; and a transaction processing apparatus, and allowing: the first and second image processing servers to sequentially perform their own and different image processing operations on target image data originated from the image forming apparatus; and the transaction processing apparatus to process a transaction for all finished image processing operations, the first image processing server comprising:
a first image processor which performs a first image processing operation on the target image data received from the image forming apparatus;
a first reference information generator which determines a reference value for a reference item based on which to calculate an amount of charge for the first image processing operation of the first image processor, based on the target data, and generates first reference information indicating the determined reference value;
a first calculator which calculates an amount of charge for the first image processing operation of the first image processor based on the reference value determined by the first reference information generator and an amount of charge per unit set on the first image processing server, and generates first charge information indicating the calculated amount of charge; and
a transmitter which transmits to the next location, the first reference information generated by the first reference information generator and the first charge information generated by the first calculator, separately from the image data to be obtained by the first image processing operation, and the second image processing server comprising:
a second image processor which performs a second image processing operation on the target image data after the first image processing server finished the first image processing operation;
a second calculator which calculates an amount of charge for the second image processing operation of the second image processor based on the reference value determined by the first image processing server and an amount of charge per unit set on the second image processing server, and generates second charge information indicating the calculated amount of charge; and
a transmitter which transmits to another next location, the first reference information and the first charge information both generated by the first image processing server and the second charge information generated by the second calculator,
wherein the transaction processing apparatus processes a transaction for the first and second image processing operations of the first and second image processing servers, based on the first and second charge information.

[2] The image processing system as recited in Claim 1, wherein:
the second image processing server further comprises a second reference information generator which determines a reference value for a reference item based on which to calculate an amount of charge for the second image processing operation of the second image processor, based on the target image data and generate second reference information indicating the determined reference value; and
there is more than one reference item requiring a reference value, based on which to calculate an amount of charge, and the first reference information generator of the first image processing server and the second reference information generator of the second image processing server determine reference values for their available reference items which are still blank, and generate the first and second reference information, respectively.

[3] The image processing system as recited in Claim 2, wherein:
the image forming apparatus generates estimation reference information collectively including the determined reference values for the multiple reference items, being to be transferred to the first and second image processing servers; and
the first and second image processing servers determine reference values for their available reference items which is still blank in the estimation reference information, and generate the first and second reference information, respectively, by writing the determined reference values into the estimation reference information.

[4] The image processing system as recited in Claim 1, wherein the first and second image processing servers transfer their generated reference information and their generated charge information to the next location via a transfer route different from the other one to transfer the target image data.

[5] The image processing system as recited in Claim 3, wherein the image forming apparatus transmits the estimation reference information to the first image processing server via a transfer route different from the other one to transfer the target image data.

[6] The image processing system as recited in Claim 1, wherein:

the transaction processing apparatus is connected to the image forming apparatus; and the image forming apparatus calculates the sum of the amounts of charge indicated by the first and second charge information, and the transaction processing apparatus charges the sum of the amounts of charge.

[7] The image processing system as recited in Claim 1, wherein the second image processing server further comprises:

a judgment portion which judges whether or not there is the need to change the reference value determined by the first image processing server, depending on the second image processing operation; and an overwriting portion which overwrites the determined reference value with a new calculated reference value if the judgment portion judges that there is the need to change the reference value determined by the first image processing server.

[8] The image processing system as recited in Claim 1, wherein the reference item is the number of characters, and the reference value for the reference item is the total number of the characters in the target image data.

[9] The image processing system as recited in Claim 1, wherein the reference item is the number of the target sides of sheets, and the reference value for the reference item is the total number of the target sides of sheets in the target image data.

[10] The image processing system as recited in Claim 1, wherein the reference item is the size of document spaces, and the reference value for the reference item is the gross size of the document spaces in the target image data.

[11] The image processing system as recited in Claim 1, wherein:

the image forming apparatus further comprises an order information generator which generates order information indicating the order of the first and second image processing servers' performing the image processing operations; and the target image data, the first and second reference information, and the first and second charge information are transferred to the first and second image processing servers to be processed thereby, in the order of image processing operations indicated by the order information generated by the order information generator, and the first and second charge information generated by the first and second image processing servers are written into the order information.

[12] A method for an image processing system comprising: an image forming apparatus; first and second image processing servers being connected to the image forming apparatus via a network; and a transaction processing apparatus, and allowing: the first and second image processing servers to sequentially perform their own and different image processing operations on target image data originated from the image forming apparatus; and the transaction processing apparatus to process a transaction for all finished image processing operations, the method comprising:

the first image processing server's:

performing a first image processing operation on the target image data received from the image forming apparatus;

determining a reference value for a reference item based on which to calculate an amount of charge for the first image processing operation, based on the target data, and generating reference information indicating the determined reference value;

calculating an amount of charge for the first image processing operation based on the determined reference value and an amount of charge per unit set on the first image processing server, and generates first charge information indicating the calculated amount of charge; and transmitting to the next location, the generated first reference information and first charge information, separately from the image data to be obtained by the first image processing operation, and the second image processing server's:

performing a second image processing operation on the target image data after the first image processing server finished the first image processing operation;

calculating an amount of charge for the second image processing operation based on the reference value determined by the first image processing server and an amount of charge per unit set on the second image processing server, and generates second charge information indicating the calculated amount of charge; and transmitting to another next location, the first reference information and the first charge information both generated by the first image processing server and the generated second charge information, wherein the transaction processing apparatus processes a transaction for the first and second image processing operations of the first and second image processing servers, based on the first and second charge information.

According to the embodiment as recited in the aforementioned item [1], the first image processing server determines a reference value for a reference item based on which to calculate an amount of charge for its own image processing service, based on target image data received from the image forming apparatus, and generates first reference information indicating the determined reference value. And the first image processing server calculates an amount of charge for its own image processing service based on the determined reference value and an amount of charge per unit set on the first image processing server itself, and generates first charge information indicating the calculated amount of charge. And then, the first image processing server transmits the generated first reference information and first charge information to the next location, separately from the target image data to be processed by the first image processing sever itself. On the other hand, the second image processing server calculates an amount of charge for its own image processing service based on the reference value determined by the first image processing server and an amount or charge set on the second image processing server itself, and generates second charge information indicating the calculated amount of charge. And the second image processing server transmits to another next location, this second charge information, and the first reference information and the first charge information both generated by the first image processing server. And then, the transaction processing apparatus processes a transaction for the image processing services of the first and second image processing servers, based on the first and second charge information.

In other words, the first and second image processing servers determine amounts of charge for their own image processing services based on the reference value determined by the first image processing server, and transmit the first reference information and the first and second charge information individually, separately from the target image data. That allows the first and second image processing servers to transfer the first reference information and the first and second charge information and calculate amounts of charge for their own image processing services, before performing their own image processing services, and further allows the transaction processing apparatus to process a transaction before the first and second image processing servers perform their own image processing services. It is also advantage, if it is a job to transfer image data having been processed already to the next location automatically, that transaction processing is performed before the job, because the user does not have to wait uselessly by the side of the image forming apparatus until the job is finished.

It is not the image forming apparatus, but the first and second image processing servers that determine amounts of charge for the image processing services, which leads to estimating the amounts of charge and processing a transaction with the accurate information which is updated in real-time.

According to the embodiment as recited in the aforementioned item [2], there is more than one reference item requiring a reference value, based on which to calculate an amount of charge, and the first and second image processing servers determine reference values for their available reference items which are still blank, individually. In this way, reference values for different items, for example the number of the target sides of sheets and the number of characters, can be determined accurately.

According to the embodiment as recited in the aforementioned item [3], the image forming apparatus generates estimation reference information collectively including the determined reference values for the multiple reference items. The generated estimation reference information is transferred to the first and second image processing servers, and the first and second image processing servers further generate first and second reference information by writing the determined reference values into the generated estimation reference information, respectively. In other words, the estimation reference information is a convenient source consolidating the first and second reference information generated by the first and second image processing servers, making the use of the reference information easier.

According to the embodiment as recited in the aforementioned item [4], the first and second image processing servers transfer their generated reference information and their generated charge information to the next location via a transfer routine different from the other one to transfer the target image data. In this way, the reference information and the charge information can be transferred individually, separately from the target image data.

According to the embodiment as recited in the aforementioned item [5], the image forming apparatus can transmit the estimation reference information separately from the target image data.

According to the embodiment as recited in the aforementioned item [6], when there provided a transaction processing apparatus being connected to the image forming apparatus, the transaction processing apparatus performs transaction processing.

According to the embodiment as recited in the aforementioned item [7], the second image processing server can overwrite the reference value determined by the first image processing server, and therefore can calculate an amount of charge accurately.

According to the embodiment as recited in the aforementioned item [8], an amount of charge can be calculated based on the total number of the characters in the target image data.

According to the embodiment as recited in the aforementioned item [9], an amount of charge can be calculated based on the total number of the target sides of sheets in the target image data.

According to the embodiment as recited in the aforementioned item [10], an amount of charge can be calculated based on the gross size of the document spaces in the target image data.

According to the embodiment as recited in the aforementioned item [11], the charge information and etc. generated by the first and second image processing servers and the target image data are transferred the next location according to order information indicating the order of performing image processing generated by the image forming apparatus. And the estimation reference information is a convenient source consolidating the first and second charge information generated by the first and second image processing servers, making the use of the charge information easier.

According to the embodiment as recited in the aforementioned item [12], the first reference information and the first and second charge information are transferred individually, separately from the target image data, which allows the transaction processing apparatus to perform transaction processing before the image processing services are performed. And it is not the image forming apparatus, but the first and second image processing servers that generate reference information, which leads to processing a transaction with the accurate information which is updated in real-time.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g. of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to". In this disclosure and during the prosecution of this application, means-plus-function or step-plus-function limitations will only be employed where for a specific claim limitation all of the following conditions are present In that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example", and "NB" which means "note well".

What is claimed is:

1. An image processing system comprising: an image forming apparatus; first and second image processing servers being connected to the image forming apparatus via a network; and a transaction processing apparatus, and allowing: the first and second image processing servers to sequentially perform their own and different image processing operations on target image data originated from the image forming apparatus; and the transaction processing apparatus to process a transaction for all finished image processing operations, the first image processing server comprising:
  a first image processor which performs a first image processing operation on the target image data received from the image forming apparatus;
  a first reference information generator which determines a reference value for a reference item based on which to calculate an amount of charge for the first image processing operation of the first image processor, based on the target data, and generates first reference information indicating the determined reference value;
  a first calculator which calculates an amount of charge for the first image processing operation of the first image processor based on the reference value determined by the first reference information generator and an amount of charge per unit set on the first image processing server, and generates first charge information indicating the calculated amount of charge; and
  a transmitter which transmits to the next location, the first reference information generated by the first reference information generator and the first charge information generated by the first calculator, separately from the image data to be obtained by the first image processing operation, and the second image processing server comprising:
  a second image processor which performs a second image processing operation on the target image data after the first image processing server finished the first image processing operation;
  a second calculator which calculates an amount of charge for the second image processing operation of the second image processor based on the reference value determined by the first image processing server and an amount of charge per unit set on the second image processing server, and generates second charge information indicating the calculated amount of charge; and
  a transmitter which transmits to the next location, the first reference information and the first charge information both generated by the first image processing server and the second charge information generated by the second calculator, wherein the transaction processing apparatus processes a transaction for the first and second image processing operations of the first and second image processing servers, based on the first and second charge information.

2. The image processing system as recited in claim 1, wherein:
the second image processing server further comprises a second reference information generator which determines a reference value for a reference item based on which to calculate an amount of charge for the second image processing operation of the second image processor, based on the target image data and generate second reference information indicating the determined reference value; and
there is more than one reference item requiring a reference value, based on which to calculate an amount of charge, and the first reference information generator of the first image processing server and the second reference information generator of the second image processing server determine reference values for their available reference items which are still blank, and generate the first and second reference information, respectively.

3. The image processing system as recited in claim 2, wherein:
the image forming apparatus generates estimation reference information collectively including the determined reference values for the multiple reference items, being to be transferred to the first and second image processing servers; and
the first and second image processing servers determine reference values for their available reference items which is still blank in the estimation reference information, and generate the first and second reference information, respectively, by writing the determined reference values into the estimation reference information.

4. The image processing system as recited in claim 3, wherein the image forming apparatus transmits the estimation reference information to the first image processing server via a transfer route different from the other one to transfer the target image data.

5. The image processing system as recited in claim 1, wherein the first and second image processing servers transfer their generated reference information and their generated charge information to the next location via a transfer route different from the other one to transfer the target image data.

6. The image processing system as recited in claim 1, wherein:
the transaction processing apparatus is connected to the image forming apparatus; and
the image forming apparatus calculates the sum of the amounts of charge indicated by the first and second charge information, and the transaction processing apparatus charges the sum of the amounts of charge.

7. The image processing system as recited in claim 1, wherein the second image processing server further comprises:
a judgment portion which judges whether or not there is the need to change the reference value determined by the first image processing server, depending on the second image processing operation; and
an overwriting portion which overwrites the determined reference value with a new calculated reference value if the judgment portion judges that there is the need to change the reference value determined by the first image processing server.

8. The image processing system as recited in claim 1, wherein the reference item is the number of characters, and the reference value for the reference item is the total number of the characters in the target image data.

9. The image processing system as recited in claim 1, wherein the reference item is the number of the target sides of sheets, and the reference value for the reference item is the total number of the target sides of sheets in the target image data.

10. The image processing system as recited in claim 1, wherein the reference item is the size of document spaces, and the reference value for the reference item is the gross size of the document spaces in the target image data.

11. The image processing system as recited in claim 1, wherein:
the image forming apparatus further comprises an order information generator which generates order information indicating the order of the first and second image processing servers' performing the image processing operations; and
the target image data, the first and second reference information, and the first and second charge information are transferred to the first and second image processing servers to be processed thereby, in the order of image processing operations indicated by the order information generated by the order information generator, and the first and second charge information generated by the first and second image processing servers are written into the order information.

12. A method for an image processing system comprising: an image forming apparatus; first and second image processing servers being connected to the image forming apparatus via a network; and a transaction processing apparatus, and allowing: the first and second image processing servers to sequentially perform their own and different image processing operations on target image data originated from the image forming apparatus; and the transaction processing apparatus to process a transaction for all finished image processing operations, the method comprising:
the first image processing server's:
performing a first image processing operation on the target image data received from the image forming apparatus;
determining a reference value for a reference item based on which to calculate an amount of charge for the first image processing operation, based on the target data, and generating reference information indicating the determined reference value;
calculating an amount of charge for the first image processing operation based on the determined reference value and an amount of charge per unit set on the first image processing server, and generates first charge information indicating the calculated amount of charge; and
transmitting to the next location, the generated first reference information and first charge information, separately from the image data to be obtained by the first image processing operation, and
the second image processing server's:
performing a second image processing operation on the target image data after the first image processing server finished the first image processing operation;
calculating an amount of charge for the second image processing operation based on the reference value determined by the first image processing server and an amount of charge per unit set on the second image processing server, and generates second charge information indicating the calculated amount of charge; and
transmitting to the next location, the first reference information and the first charge information both generated by the first image processing server and the generated second charge information,
wherein the transaction processing apparatus processes a transaction for the first and second image processing operations of the first and second image processing servers, based on the first and second charge information.

13. The method for the image processing system as recited in claim 12, further comprising the second image processing server's determining a reference value for a reference item based on which to calculate an amount of charge for the second image processing operation, based on the target image data and generating second reference information indicating the determined reference value, and wherein there is more than one reference item requiring a reference value, based on which to calculate an amount of charge, and the first and second image processing servers determine reference values for their available reference items which are still blank, and generate the first and second reference information, respectively.

14. The method for the image processing system as recited in claim 13, wherein:
the image forming apparatus generates estimation reference information collectively including the determined reference values for the multiple reference items, being to be transferred to the first and second image processing servers; and
the first and second image processing servers determine reference values for their available reference items which is still blank in the estimation reference information, and generate the first and second reference information, respectively, by writing the determined reference values into the estimation reference information.

15. The method for the image processing system as recited in claim 14, wherein the image forming apparatus transmits the estimation reference information to the first image processing server via a transfer route different from the other one to transfer the target image data.

16. The method for the image processing system as recited in claim 12, wherein the first and second image processing servers transfer their generated reference information and their generated charge information to the next location via a transfer route different from the other one to transfer the target image data.

17. The method for the image processing system as recited in claim 12, wherein:
the transaction processing apparatus is connected to the image forming apparatus; and
the image forming apparatus calculates the sum of the amounts of charge indicated by the first and second charge information, and the transaction processing apparatus charges the sum of the amounts of charge.

18. The method for the image processing system as recited in claim 12, further comprising the second image processing server's:
judging whether or not there is the need to change the reference value determined by the first image processing server, depending on the second image processing operation; and
overwriting the determined reference value with a new calculated reference value if the judgment portion judges that there is the need to change the reference value determined by the first image processing server.

19. The method for the image processing system as recited in claim 12, wherein the reference item is the number of characters, and the reference value for the reference item is the total number of the characters in the target image data.

20. The method for the image processing system as recited in claim 12, wherein the reference item is the number of the target sides of sheets, and the reference value for the reference item is the total number of the target sides of sheets in the target image data.

21. The method for the image processing system as recited in claim 12, wherein the reference item is the size of document spaces, and the reference value for the reference item is the gross size of the document spaces in the target image data.

22. The method for the image processing system as recited in claim 12, further comprising the image forming apparatus's generating order information indicating the order of the first and second image processing servers' performing the image processing operations, wherein the target image data, the first and second reference information, and the first and second charge information are transferred to the first and second image processing servers to be processed thereby, in the order of image processing operations indicated by the order information generated, and the first and second charge information generated by the first and second image processing servers are written into the order information.

* * * * *